United States Patent [19]
Sugamoto et al.

[11] Patent Number: 5,836,641
[45] Date of Patent: Nov. 17, 1998

[54] STRUCTURE OF ABSORBING IMPACT ENERGY USING INTERIOR MATERIAL OF AUTOMOBILE

[75] Inventors: Tatsuya Sugamoto, Toyota; Suga Hitoshi, Nagoya; Masaya Kubo; Yuzuru Imoto, both of Toyota, all of Japan

[73] Assignee: Toyota Jidosha Kabushiki Kaisha, Japan

[21] Appl. No.: 840,854

[22] Filed: Apr. 17, 1997

Related U.S. Application Data

[62] Division of Ser. No. 742,702, Nov. 5, 1996, Pat. No. 5,660,426, which is a continuation of Ser. No. 393,310, Feb. 22, 1995, abandoned.

[30] Foreign Application Priority Data

| Feb. 22, 1994 | [JP] | Japan | 6-46605 |
| Aug. 29, 1994 | [JP] | Japan | 6-226014 |
| Jan. 19, 1995 | [JP] | Japan | 7-23307 |

[51] Int. Cl.⁶ ................................................ B60R 21/04
[52] U.S. Cl. .............................................. 296/189; 280/751
[58] Field of Search ................................ 296/189, 188; 280/748, 751, 752

[56] References Cited

U.S. PATENT DOCUMENTS

| 1,628,090 | 5/1927  | Weiss   | 267/141 |
| 3,026,224 | 3/1962  | Rogers  | 267/141 |
| 3,049,344 | 8/1962  | Hawkins | 267/141 |
| 3,779,595 | 12/1973 | Suzuki et al. | |
| 4,609,385 | 9/1986  | Daniel et al. | 296/189 X |
| 4,696,401 | 9/1987  | Wallace | 206/594 |
| 4,786,540 | 11/1988 | Bruhnke et al. | 428/71 |
| 5,163,730 | 11/1992 | Welch | 296/189 |
| 5,544,933 | 8/1996  | Shahab et al. | 296/188 X |
| 5,575,500 | 11/1996 | Mimura et al. | 280/751 |

FOREIGN PATENT DOCUMENTS

| 1 115 317 | 5/1958  | France . |
| 1 909 252 | 1/1965  | Germany . |
| 37 40 687 | 8/1989  | Germany . |
| 4015375   | 11/1991 | Germany ................ 280/751 |
| 4 42450   | 4/1992  | Japan . |
| 4 42451   | 4/1992  | Japan . |
| 4 42452   | 4/1992  | Japan . |
| 4 125953  | 11/1992 | Japan . |
| 5 19010   | 3/1993  | Japan . |

*Primary Examiner*—Dennis H. Pedder
*Attorney, Agent, or Firm*—Cushman Darby & Cushman Intellectual Property Group of Pillsbury Madison & Sutro, LLP

[57] ABSTRACT

A structure of absorbing impact energy using a non-metallic interior material for an automobile is provided. The interior material is arranged on the inside of an inner panel of a structure member which includes the inner panel and an outer panel and is formed to have a closed structure in cross section taken along an horizontal imaginary plane. An energy absorbing space in defined between the inner panel and the interior material. A non-metallic energy absorber formed separately from the interior material is mounted on the inner panel or the interior material so as to be arranged in the space.

8 Claims, 22 Drawing Sheets

F I G. 13
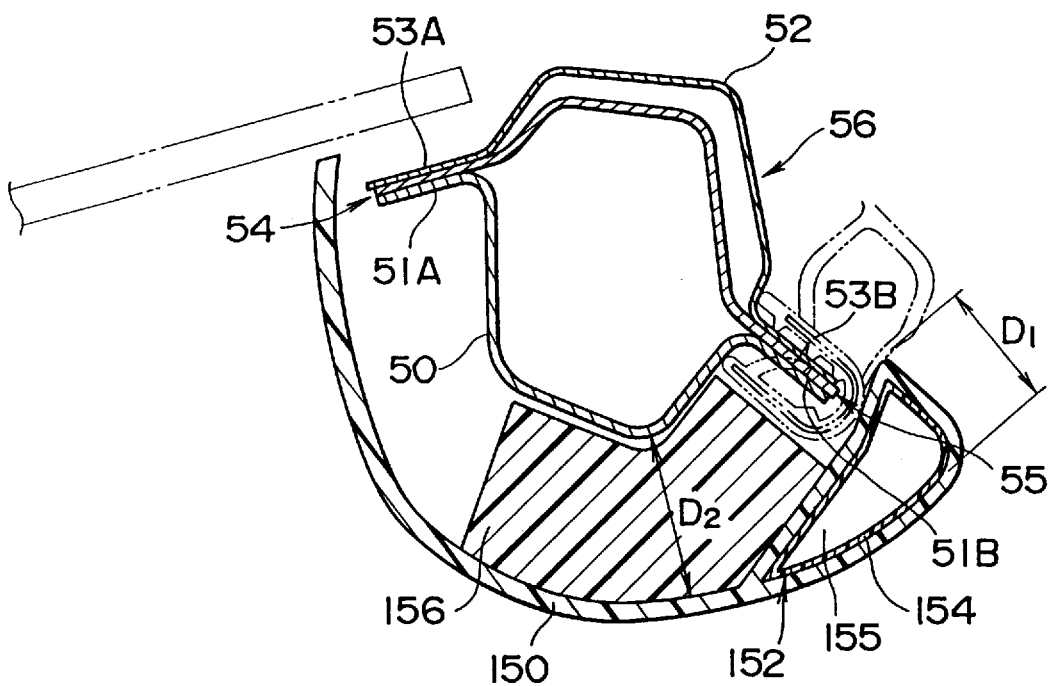

STRUCTURE OF ABSORBING IMPACT ENERGY USING INTERIOR MATERIAL OF AUTOMOBILE

This is a division of application Ser. No. 08/742,702, filed Nov. 5, 1996, now U.S. Pat. No. 5,660,426, which was a continuation of Ser. No. 08/393,310 filed Feb. 22, 1995, now abandoned.

BACKGROUND OF THE INVENTION

1. Field of the Invention

This invention relates to a structure of absorbing impact energy using a non-metallic interior material arranged on the inside of a panel of a structural member of a vehicle body, and more particularly, to an absorption structure, in which impact energy exerted through a front pillar, a center pillar, a rear pillar, a roof side rail or like structural member of a vehicle body is absorbed by an energy absorber attached to a pillar garnish, a roof panel, a roof side garnish or like interior material arranged on the inside of the structural member to alleviate impact.

2. Description of the Related Art

There has been disclosed a hollow pillar garnish arranged on the inside of a pillar to cover the pillar in order to alleviate or reduce impact exerted through the pillar and other vehicle body structural members having high rigidity at the time of vehicle crash. (See Japanese Utility Model Disclosure (KOKAI) No. 4-125953) Incidentally, it is confirmed that a plurality of longitudinally and laterally arranged ribs can be also used for the absorption of energy by appropriately setting the rigidity. Thus, impact energy can be absorbed even by a structure having the pillar garnish and the ribs which are molded as one body such as to locate the ribs on the back side, i.e., the outside of the pillar garnish.

In case of forming the hollow pillar garnish, since a space necessary for the absorption of energy, i.e., a space of a size of 15 to 30 mm should be ensured by a hollow portion of the pillar garnish, the size of the pillar garnish is increased as a whole. When such a large pillar garnish is formed into the hollow pillar garnish by blow molding, the resultant hollow pillar garnish easily varies in thickness, and any stable absorbability of energy cannot be attained.

On the other hand, when the plurality of ribs are provided on the outside of the pillar garnish as one body, it is difficult to attain desired absorbability of energy due to many restrictions from the viewpoint of molding. In addition, the surface of the pillar garnish corresponding to the rib portions, i.e., the inside surface of the pillar garnish sometimes creates a strain in the form of a concavity or the like at the time of molding. In this case, since the inside surface of the pillar garnish is open to the view in a compartment to constitute the interior of the compartment, the strain thus created degrades the value of a product.

SUMMARY OF THE INVENTION

It is an object of the present invention to provide a structure of absorbing impact energy using an interior material of an automobile, in which stable absorbability of energy can be attained, and a strain created at the time of molding can be prevented from being open to the view on the inside surface of the interior material.

According to the present invention, there is provided a structure of absorbing impact energy using a non-metallic interior material arranged on the inside of a panel of a structural member of a vehicle body. The structure of the present invention comprises an energy absorbing space defined between the panel and the interior material, and a non-metallic energy absorber formed separately from the interior material, and mounted on one of the panel and the interior material so as to be arranged within the energy absorbing space.

In case of embodying the absorption structure according to the present invention, the energy absorbing space and the energy absorber can respectively take various shapes. In general, the structural member is provided with an inner panel and an outer panel. Further, the structural member has two flange joint portions formed by joining respective flanges of the inner and outer panels together in an overlap state, and is formed to have a closed structure in cross section taken along an imaginary plane. Such a structural member includes a front pillar, a center pillar, a rear pillar, a roof side rail of a vehicle body or like member having high rigidity. When a vehicle crashes, large impact is exerted through the inner panel of the structural member. According to the present invention utilizing the interior material arranged on the inside of the structural member in order to alleviate or reduce such largely exerted impact, the energy absorbing space is preferably composed of a first space defined by the interior material and the edge of at least one of two flange joint portions in the direction of extension of the one flange joint portion in the imaginary plane, and a second space defined by the interior material and the inner panel other than the flange joint portions. In this case, the energy absorber is preferably arranged within both the first and second spaces.

When a load of not less than a predetermined value is applied, the interior material is deformed together with the energy absorber, and the energy absorber mainly absorbs the impact energy. Since the interior material is formed separately from the energy absorber, the size of the energy absorber can be reduced as a whole in comparison with the interior material to form only the energy absorber with accuracy. Further, the interior material and the energy absorber can be designed and manufactured by attaching importance to the respective functions of the interior material and the energy absorber without any substantial restrictions from the viewpoint of molding, and as a result, ideal absorbability of energy can be attained. Furthermore, even though the energy absorber creates a strain at the time of molding, the strain is never open to the view in the compartment, since the energy absorber is arranged on the outside of the interior material.

BRIEF DESCRIPTION OF THE DRAWINGS

The foregoing and other objects and features of the present invention will become apparent from the following description of preferred embodiments of the invention with reference to the accompanying drawings, in which:

FIG. 9 is a perspective view showing the outside of an energy absorber as a further embodiment available for the absorption structure shown in FIG. 3, in which

FIG. 13 is a sectional view similar to that of FIG. 1 and showing a structure of absorbing impact energy using an interior material for an automobile as a yet further embodiment of the present invention;

FIG. 17 is a sectional view showing a structure of absorbing impact energy using an interior material for an automobile as a yet further embodiment of the present invention, in which

FIG. 20 is a perspective view showing a joint portion of a longitudinal rib and a lateral rib of a lattice-like member available for the absorption structure shown in FIG. 17, in which

FIG. 22 is a schematic view showing the action of a pillar garnish available for the absorption structure shown in FIG. 17 and that of a pillar garnish having an orthogonal rib, in which

FIG. 23 is a schematic view showing the action of a pillar garnish available for the absorption structure shown in FIG. 17 and that of a model for the comparison with the pillar garnish, in which

DETAILED DESCRIPTION OF PREFERRED EMBODIMENTS

Figure 1:
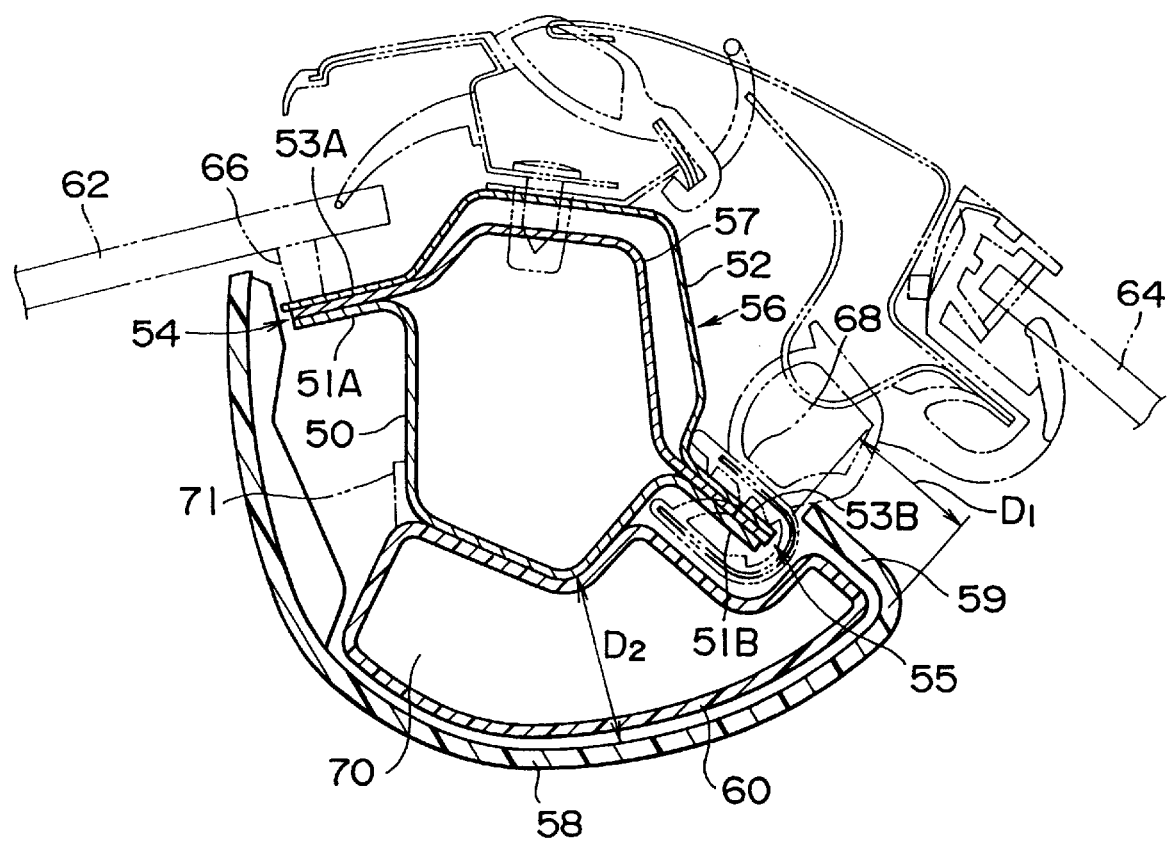
FIG. 1 is a sectional view taken along a line 1—1 in FIG. 16 and showing a structure of absorbing impact energy using an interior material for an automobile as an embodiment of the present invention.

As shown in FIG. 1, according to a structure of absorbing impact energy, an interior material 58 arranged on the inside of an inner panel 50 of a structural member 56 of a vehicle body is used to absorb impact energy. The structural member 56 has two flange joint portions 54, 55 formed by joining flanges 51A, 51B of the inner panel 50 and respectively confronting flanges 53A, 53B of an outer panel 52 together in an overlap state, and is formed to have a closed structure in cross section taken along a substantially horizontal imaginary plane. In this absorption structure, the interior material 58 is arranged at a space $D_1$ from the edge of at least one flange joint portion 55 of two joint portions 54, 55 in the direction of extension of the one flange joint portion 55 in the imaginary plane, namely in the plane of the drawing in FIG. 1 and at a space $D_2$ from the inner panel 50. In this case, two spaces constitute an energy absorbing space and an energy absorber 60 formed separately from the interior material 58 is arranged within both the spaces $D_1$, $D_2$.

In an embodiment shown in FIG. 1, the structural member 56 corresponds to a front pillar, and the interior material 58 corresponds to a pillar garnish. The front pillar 56 has a reinforcing panel 57 arranged between the inner panel 50 and the outer panel 52. As is apparent from FIGS. 1 and 16, the front pillar 56 is closely disposed to a wind shield glass 62 on one side, and a door glass 64 on the other side. The flange joint portion 54 supports the wind shield glass 62 through a seal material 66. Thus, the flange joint portion 54 at the forward side of the vehicle body is located apart from an occupant. On the other hand, the flange joint portion 55 at the rearward side of the vehicle body is located close to the occupant faces to a compartment. Accordingly, in the absorption structure of the present invention, the flange joint portion 55 at the rearward side of the vehicle body is covered with the energy absorber 60 to absorb impact energy.

The pillar garnish 58 is manufactured by molding a hard resin such as polyethylene and polypropylene, and arranged at the spaces $D_1$, $D_2$ from the front pillar 56. The spaces $D_1$, $D_2$ are preferably set to be within the range of 10 to 20 mm, and 15 to 30 mm, respectively.

The energy absorber 60 is arranged within both the spaces $D_1$, $D_2$ and deformed upon receipt of a load applied through the pillar garnish 58 to absorb the impact energy caused by the load. By so doing, use can be made of an energy absorber which will be described later.

In the embodiment shown in FIG. 1, the energy absorber 60 is a product formed by blow molding and has a hollow portion 70. When the blow molding is used to manufacture the energy absorber, the time and labor taken for manufacture can be reduced, and the energy absorber can be easily formed to be fit into the spaces $D_1$, $D_2$ in the imaginary plane. In addition, the energy absorber having such a shape can be easily extended by a predetermined length in the vertical direction corresponding to a direction perpendicular to the plane of the drawing. While the shape of the energy absorber 60 in the imaginary plane can be arbitrarily selected, the energy absorber is preferably formed to cover the edge of the flange joint portion 55 on the extension of the flange joint portion 55. Furthermore, the energy absorber is preferably formed to be approximately in contact with the inner panel 50 and an opening trim 68 mounted on the flange joint portion 55. However, the energy absorber is not always necessarily formed to extend up to the neighborhood of the flange joint portion 54. The energy absorber 60 can be molded by the same hard resin as that for the pillar garnish 58 or a hard resin such as vinyl chloride.

A mounting seat 71 provided on the outside of the hollow portion 70 is used to mount the energy absorber 60 on the inner panel 60 of the front pillar 56 with a screw or a clip (not shown). Further, the pillar garnish 58 is mounted on the energy absorber 60 with screws or clips.

According to the embodiment shown in FIG. 1, the energy absorber is arranged within both the space defined by the interior material and the edge of at least one of two flange joint portions and the space defined by the interior material and the inner panel.

Therefore, when a load of not less than a predetermined value is applied to the energy absorber through the interior material, the energy absorber is deformed to absorb the impact energy. Particularly, since the flange joint portion is covered with the energy absorber, it is possible to reduce large impact caused by the flange joint portion having high rigidity, Further, even a complicate-shaped energy absorber can be smoothly formed by blow molding.

Figure 2:
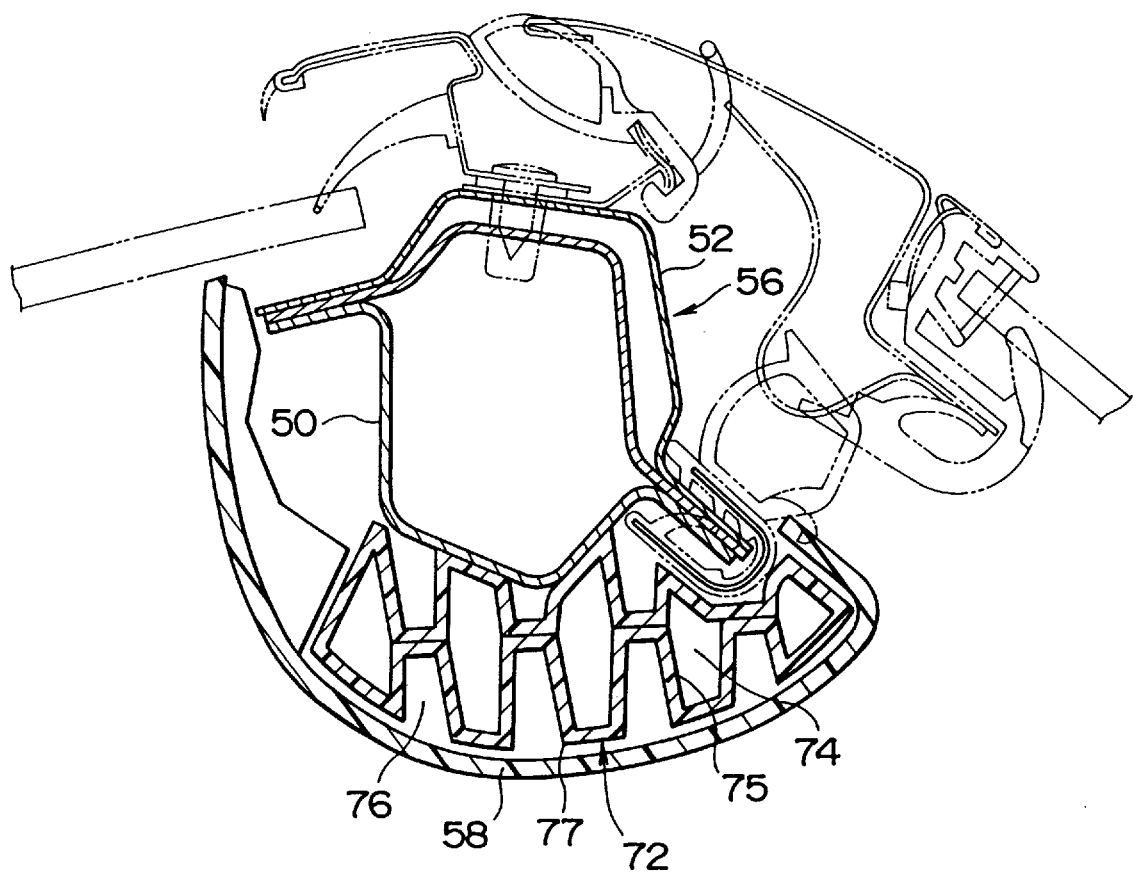
FIG. 2 is a sectional view similar to that of FIG. 1 and showing a structure of absorbing impact energy using an interior material for an automobile as another embodiment of the present invention.

An embodiment shown in FIG. 2 is similar in constitution of the front pillar 56 and the pillar garnish 58 to the embodiment shown in FIG. 1, except that an energy absorber 72 is formed by blow molding such as to have the irregular shape in cross section in the imaginary plane. The energy absorber 72 has five hollow portions 74 partitioned by a wall 75 which is bent into a zigzag shape in the imaginary plane to define concave portions 76 and convex portions 77. The energy absorber 72 and the pillar garnish 58 can be respectively mounted on the inner panel 50 and the energy absorber 72 in the similar way to the embodiment shown in FIG. 1.

According to the embodiment shown in FIG. 2, the absorbability of energy can be easily adjusted by varying the number of irregular portions, the depth and shape of each irregular portion and the size of each hollow portion.

According to the absorption structure shown in FIGS. 1 and 2, when a load of not less than a predetermined value is applied to the pillar garnish 58, the pillar garnish 58 is deformed. With the deformation of the pillar garnish 58, the energy absorber 60 or 72 is deformed to absorb the impact energy caused by the load. In case of the energy absorber 60, the whole energy absorber 60 is deformed. On the other hand, in case of the energy absorber 72, the convex portion 77 corresponding to an input portion of the load is first deformed, and subsequently, the convex portion 77 adjacent to the deformed convex portion 77 is deformed. In this manner, the deformation is gradually transferred to result in the wholly deformed energy absorber.

Figure 3:
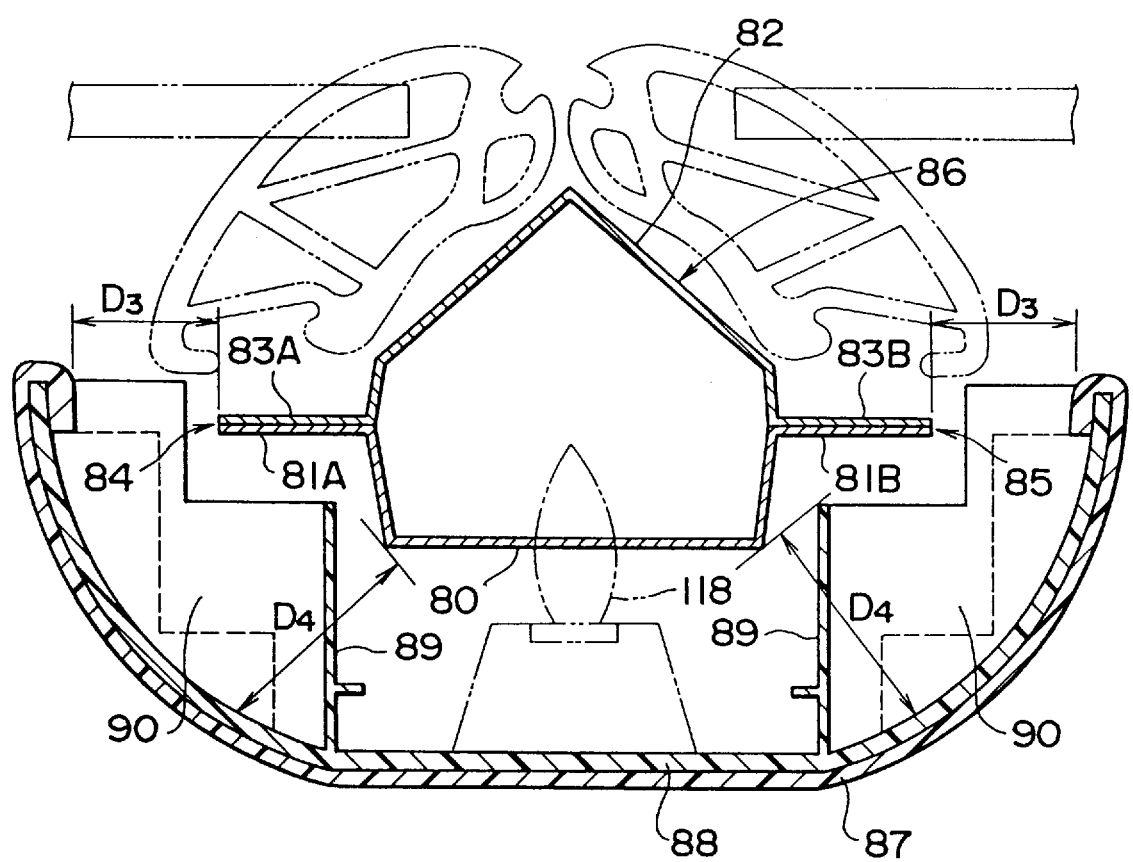
FIG. 3 is a sectional view taken along a line 3—3 in FIG. 16 and showing a structure of absorbing impact energy using an interior material for an automobile as a further embodiment of the present invention.

According to a structure of absorbing impact energy as shown in FIG. 3, an interior material 88 arranged on the inside of an inner panel 80 of a structural member 86 of the vehicle body is used to absorb impact energy. The structural member 86 has two flange joint portions 84, 85 formed by joining flanges 81A, 81B of the inner panel 80 and respectively confronting flanges 83A, 83B of an outer panel 82 together in an overlap state, and is formed to have a closed structure in cross section taken along a substantially horizontal imaginary plane. In the illustrated embodiment, the structural member 86 corresponds to a center pillar, and the interior material 88 corresponds to a pillar garnish. According to the absorption structure, the interior material 88 is arranged at a space $D_3$ from the edge of each flange joint portion in the direction of each extension of two flange joint portions 84, 85 in the plane of the drawing in FIG. 3 and at a space $D_4$ from the inner panel 80. In this case, the spaces constitute an energy absorbing space, and two energy absorbers 90 formed separately from the interior material 88 are arranged in the front and rear spaces $D_3$, $D_4$. The spaces $D_3$ and $D_4$ are preferably set to be within the range of 10 to 20 mm, and 15 to 30 mm, respectively.

Figure 4:
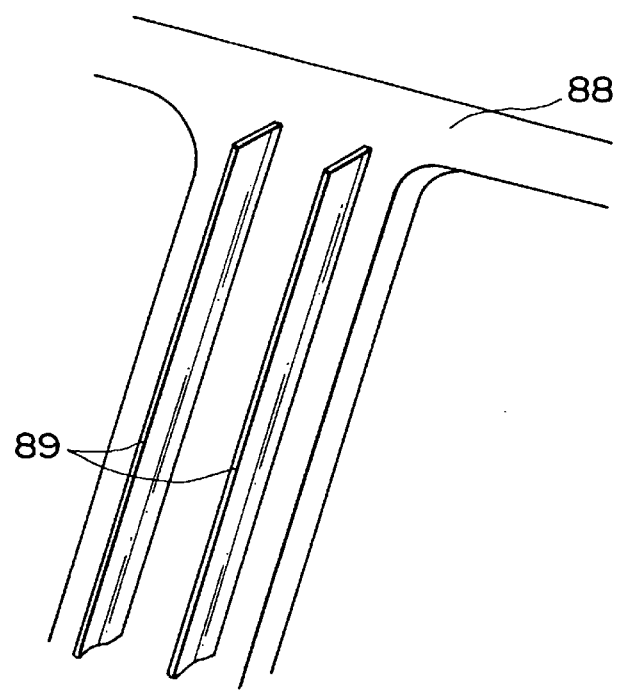
FIG. 4 is a perspective view showing the outside of a pillar garnish used for the absorption structure shown in FIG. 3.
Figure 5:
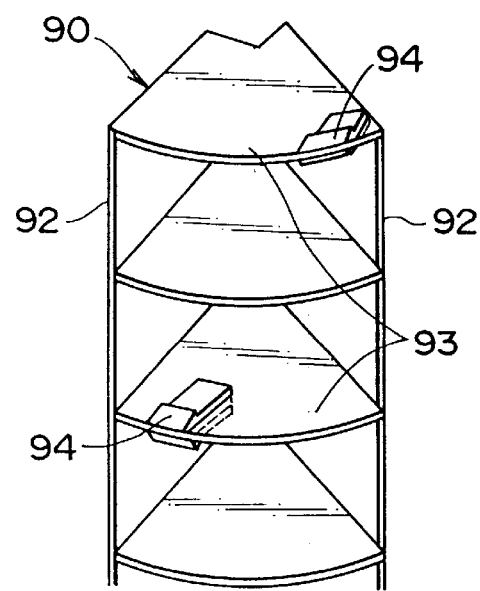
FIG. 5 is a perspective view showing the outside of an energy absorber used for the absorption structure shown in FIG. 3.

As shown in FIGS. 3 and 4, the pillar garnish 88 has a skin 87 and two vertically extending ribs 89. On the other hand, as shown in FIGS. 3 and 5, the energy absorbers 90 can be formed so as to be arranged in the front and rear of the ribs 89 of the pillar garnish 88 in the imaginary plane. Thus, any energy absorber is not arranged between the ribs 89. In case of the center pillar, it is because a front seat is disposed on the inside of the center pillar, so that there is great possibility that an occupant, who is present in front of the front seat, is struck against a portion of the center pillar 86 including the front flange joint portion 84, and an occupant, who is present in the rear of the front seat, is struck against a portion of the center pillar 86 including the rear flange joint portion 85.

The energy absorber 90 shown in FIG. 5 is formed by injection molding using the similar hard resin to that used for the pillar garnish 88. The energy absorber 90 is composed of two plate-like portions 92 located so as to substantially make a center angle of 90°, and a plurality of ribs 93 laid between the plate-like portions 92. The energy absorber 90 has a plurality of anchoring claws 94 arranged in a zigzag manner on the ribs 93 on the inside of the energy absorber 90. Herein, it is to be noted that the zigzag manner means that two anchoring claws 94 located to be adjacent to each other in the direction perpendicular to the imaginary plane have different phase relation in case of projecting the claws on the imaginary plane. On the other hand, the pillar garnish 88 has anchoring concave portions 96 provided on the outside of the pillar garnish 88 so as to respectively correspond to the plurality of anchoring claws 94.

Figure 6:
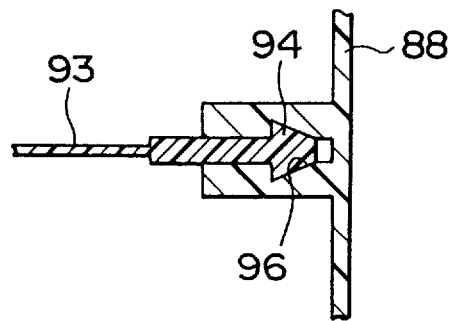
FIG. 6 is a sectional view taken along a perpendicular and showing the fit state of an anchoring claw and a concave portion used for the absorption structure shown in FIG. 3.

As shown in FIG. 6, each anchoring claw 94 is fitted into the corresponding concave portion 96 to mount the energy absorber 90 on the pillar garnish 88. The anchoring claws 94 and the concave portions 96 are formed such that when a each claw 94 is fitted into the corresponding concave portion 96 due to the deformation of a peripheral portion of the concave portion 96 at the time of passing a bulge portion of each claw 94 through the concave portion 96, the bulge portion of each claw 94 is caught by the concave portion 96 without easily slipping off from the concave portion.

Figure 7:
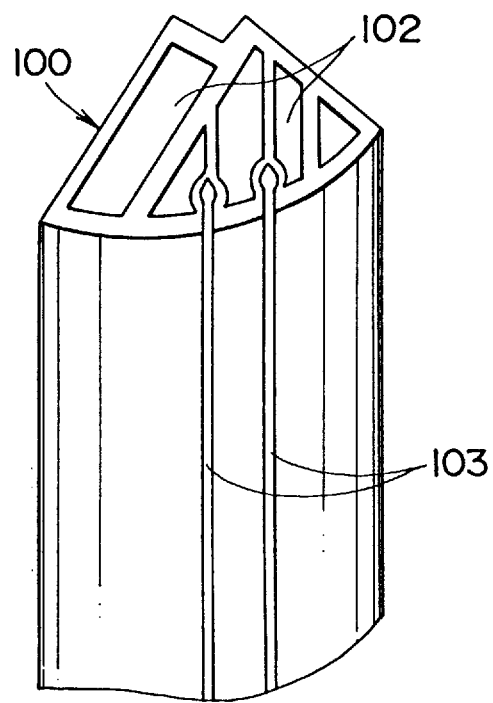
FIG. 7 is a perspective view showing the outside of an energy absorber as another embodiment available for the absorption structure shown in FIG. 3.
Figure 8:
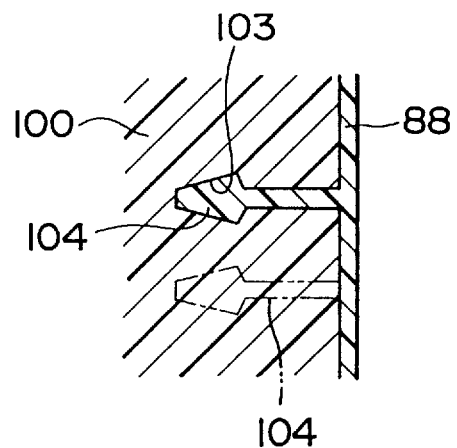
FIG. 8 is a sectional view taken along a perpendicular and showing a fit state of another anchoring claw and another concave portion available for the absorption structure shown in FIG. 3.

An energy absorber 100 shown in FIG. 7 is formed by blow molding using the similar hard resin to that used for the pillar garnish 88, and has a plurality of hollow portions 102 and two anchoring concave portions 103. Instead of the energy absorber 90, the energy absorber 100 is mounted on the pillar garnish 88. In order to fit the anchoring claws into two concave portions 103 on the inside of the energy absorber 100, a plurality of anchoring claws 104 extending outward from the outside of the pillar garnish 88 are provided alternately to face to two concave portions 103 such that the anchoring claws 104 are arranged in a zigzag manner, as shown in FIG. 8. Each anchoring claw 104 of the pillar garnish 88 is fitted into the corresponding concave portion 103 of the energy absorber 100 to mount the energy absorber 100 on the pillar garnish 88. A bulge portion of each anchoring claw 104 is smoothly fitted into the corresponding concave portion 103, since the hollow portion is provided around each concave portion 103.

Figure 9A:
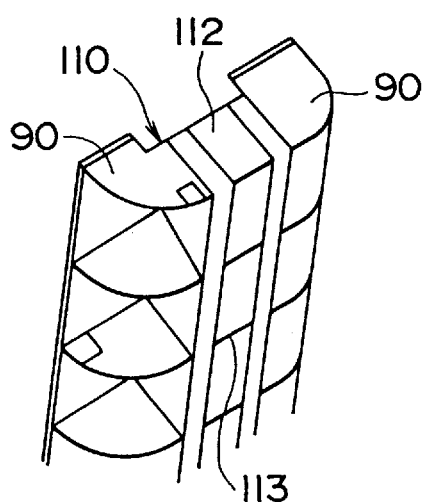
FIGS. 9(a) and 9(b) show different energy absorbers.
Figure 9B:
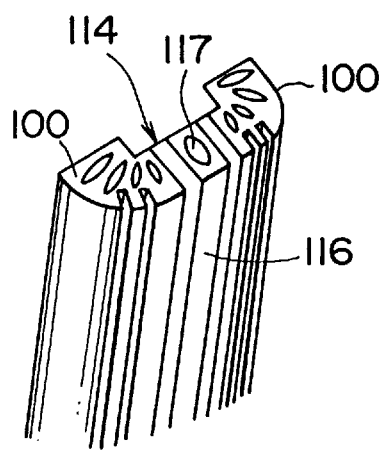

In case of the energy absorbers 90, 100, the energy absorbers are arranged in the front and rear spaces of the center pillar 86, and no energy absorber is arranged between both the spaces. An energy absorber 110 in an embodiment shown in FIG. 9(a) is composed of two energy absorbers 90 connected together as one body through an intermediate body 112, while an energy absorber 114 shown in FIG. 9(b) is composed of two energy absorbers 100 connected together as one body through an intermediate body 116. Each of the energy absorbers 110, 114 can be arranged on the whole outside of the center pillar 86. The intermediate body 112 is provided with a plurality of ribs 113 and the intermediate body 116 is provided with a hollow portion 117.

After the energy absorbers 90 or 100 are mounted on the pillar garnish 88, the pillar garnish 88 is mounted on the center pillar 86 with a plurality of clips 118 (only one of them is shown) provided at an interval in the direction perpendicular to the imaginary plane, as shown in FIG. 3.

When a load of not less than a predetermined value is applied, the pillar garnish 88 is deformed. In this state, the plurality of ribs 93 are buckled in case of the energy absorber 90, while the plurality of hollow portions 102 are depressed in case of the energy absorber 100 to absorb the impact energy caused by the load.

According to this embodiment, since not only the mounting can be simplified, but also the mounting portions are arranged in the zigzag manner, the unstableness of the energy absorbers can be prevented to bear the load in a dispersed state. As a result, even though a load is applied to the energy absorber from every directions, it is possible to attain the substantially same effects on the absorption of energy.

Figure 10:
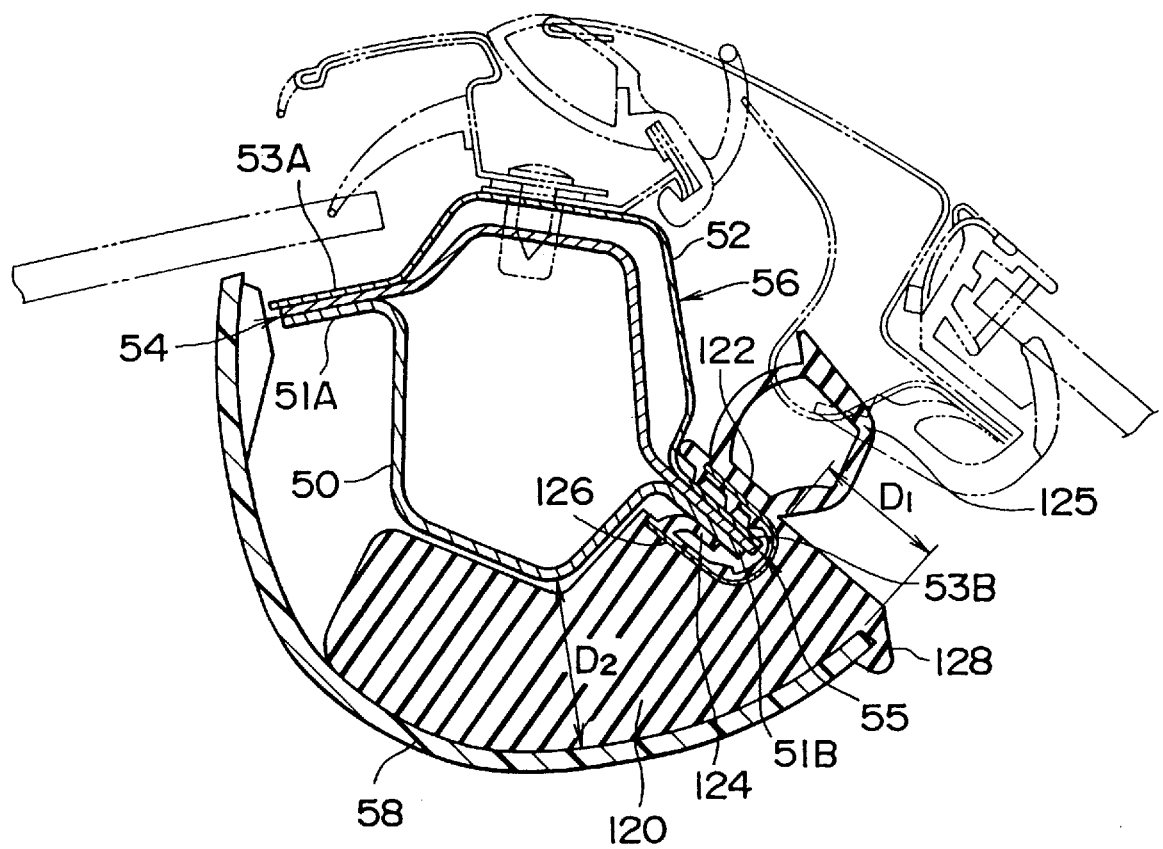
FIG. 10 is a sectional view similar to that of FIG. 1 and showing a structure of absorbing impact energy using an interior material for an automobile as a still further embodiment of the present invention.
Figure 11:
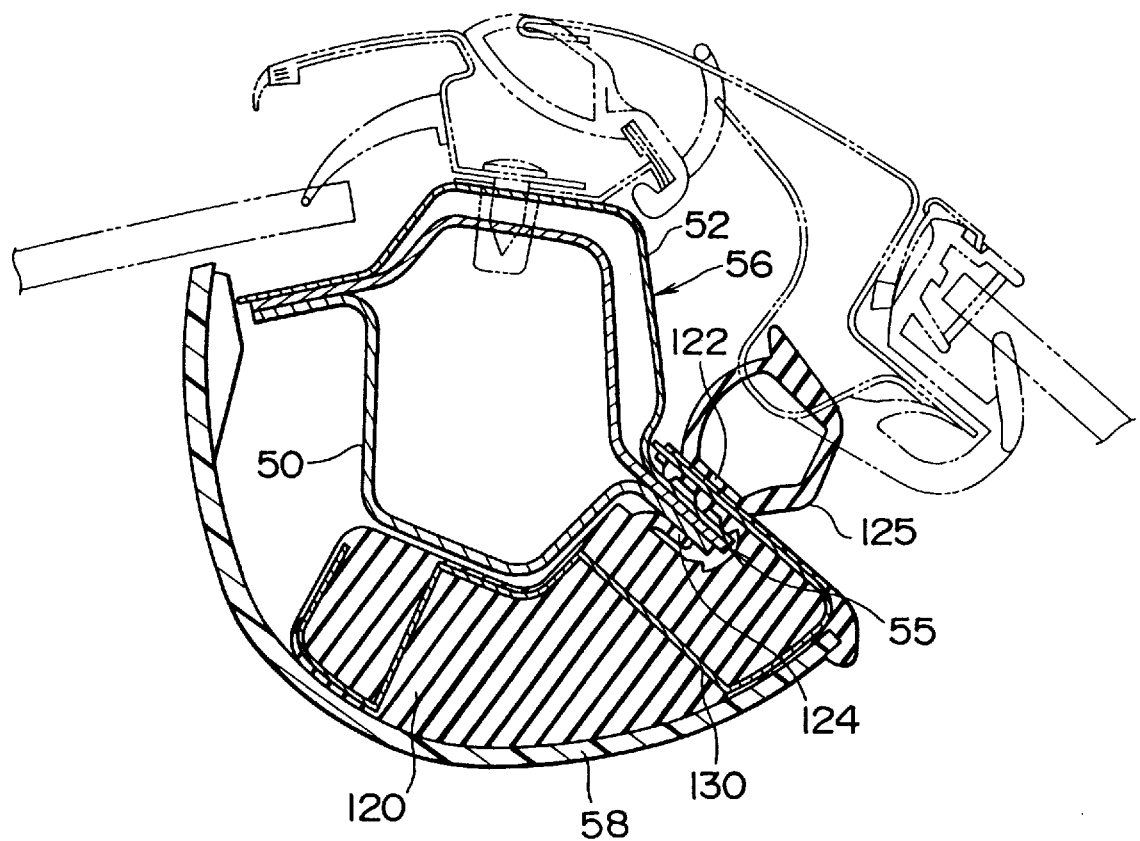
FIG. 11 is a sectional view similar to that of FIG. 1 and showing a structure of absorbing impact energy using an interior material for an automobile as a yet further embodiment of the present invention.

According to an absorption structure shown in FIGS. 10 and 11, the interior material 58 arranged on the inside of the inner panel 50 of the structural member 56 of the vehicle body is used to absorb impact energy. The structural member 56 has two flange joint portions 54, 55 formed by joining the flanges 51A, 51B of the inner panel 50 and the respectively confronting flanges 53A, 53B of the outer panel 52 together in an overlap state, and is formed to have a closed structure in cross section taken along the imaginary plane. In the illustrated embodiment, the structural member 56 corresponds to the similar front pillar to that shown in FIG. 1, and the interior material 58 corresponds to a pillar garnish. The pillar garnish 58 shown in FIG. 10 is similar to that shown in FIG. 1, except that an undercut 59 is removed from the pillar garnish 58 of FIG. 1. In this absorption structure, the pillar garnish 58 is arranged at a space $D_1$ from the edge of at least one flange joint portion 55 in the direction of extension of the one joint portion 55 in the imaginary plane and at a space $D_2$ from the inner panel 50. In this case, the spaces constitute an energy absorbing space, and an energy absorber 120 is arranged in the energy absorbing space.

In the absorption structure shown in FIG. 10, the flange joint portion 55 is further covered with an opening trim 122 formed integrally with the energy absorber 120 by extrusion molding.

The opening trim is generally molded as an independent part such as the opening trim 68 shown in FIG. 1, and fitted to the flange joint portion 55 for mounting. In this mounting state, a lip contacting the flange joint portion 55 and a seal portion contacting a door are used to prevent water from penetrating into the compartment. On the other hand, according to the present invention, a product integrally formed by extrusion molding is used to attain both the function of preventing the water from penetrating into the compartment and the function of absorbing the energy.

The energy absorber 120 and the opening trim 122 are manufactured by extrusion molding with a soft resin or urethane rubber. As a result, the energy absorber 120, that is, a portion arranged in the spaces $D_1$, $D_2$ to absorb the impact energy caused by the load, is formed integrally with the opening trim 122, that is, a portion regulated by a core material 126 having an U-like shape in cross section in the imaginary plane and having a lip 124 contacting the flange joint portion 55 and a hollow seal portion 125 contacting the door. In this case, the core material 126 is made of a highly rigid material such as a steel sheet, and extruded simultaneously with the resin to be embedded in the resin.

In the illustrated embodiment, a lip 128 is formed integrally with the energy absorber 120 such as to be projected inward from a portion of the energy absorber 120 on the extension of the flange joint portion 55 in the imaginary plane. As long as the edge of the pillar garnish 58 is covered with the lip 128, it is possible to maintain satisfactorily the external appearance of the pillar garnish 58, even though the undercut is removed from the pillar garnish 58.

In an embodiment shown in FIG. 11, the shape of a core material 130 is different from that shown in FIG. 10. Namely, the core material 130 shown in FIG. 11 has a meandering shape in the imaginary plane so as to combine the function of absorbing energy and the function of closely bringing the lip 124 of the opening trim 122 into contact with the flange joint portion 55. In this case, the thickness of the core material 130 is reduced, while the density of the resin at a portion of the opening trim 122 is increased to satisfy both the functions.

The opening trim 122 formed integrally with the energy absorber 120 is fitted to the flange joint portion 55 to closely bring the lip 124 into contact with the flange joint portion 55, and a plurality of portions of the energy absorber 120 are fixed to the inner panel 50 of the front pillar with clips (not shown), or the outside surface of the energy absorber 120 is fixed to the inner panel with a pressure sensitive adhesive double coated tape or a one-way tape. The pillar garnish 58 is similarly fixed to the energy absorber 120.

When a load of not less than a predetermined value is applied to the pillar garnish 58, the pillar garnish 58 is deformed. With the deformation of the pillar garnish 58, the energy absorber 120 is deformed to absorb the impact energy caused by the load, and the impact can be alleviated.

In this case, the absorbability of energy can be preliminarily adjusted by providing a hollow portion in the energy absorber 120 or charging the hollow portion with another energy absorber.

According to the embodiment, since the opening trim is open to the view in the compartment and located at a conspicuous portion, it is not necessary to cover the energy absorber formed integrally with the opening trim. Thus, while the pillar garnish is generally provided with an undercut portion, the pillar garnish in the embodiment can dispense with the undercut portion, and therefore, the pillar garnish can be easily manufactured. In addition, when the energy absorber is formed separately from the opening trim, the energy absorber and the opening trim are formed as two different parts. On the other hand, in the embodiment, the energy absorber and the opening trim can be formed as a single part, and therefore, the parts can be easily managed.

Figure 12:
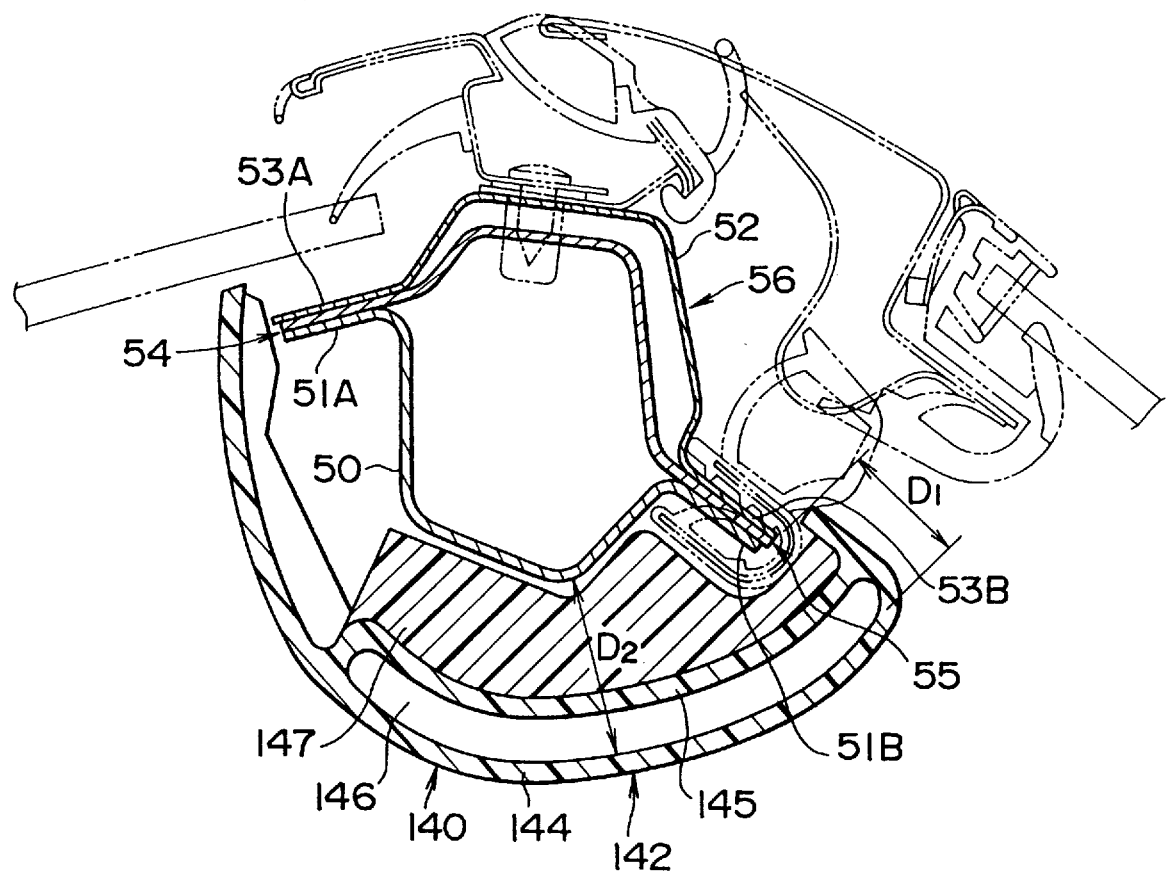
FIG. 12 is a sectional view similar to that of FIG. 1 and showing a structure of absorbing impact energy using an interior material for an automobile as a yet further embodiment of the present invention.

According to an absorption structure shown in FIG. 12, an interior material 140 arranged on the inside of the inner panel 50 of the structural member 56 of the vehicle body is used to absorb impact energy. The structural member 56 has two flange joint portions 54, 55 formed by joining the flanges 51A, 51B of the inner panel 50 and the respectively confronting flanges 53A, 53B of the outer panel 52 together in an overlap state, and is formed to have a closed structure in cross section taken along the imaginary plane. In the illustrated embodiment, the structural member 56 corresponds to the similar front pillar to that shown in FIG. 1, and the interior material 140 corresponds to a pillar garnish. In the absorption structure, the pillar garnish 140 is arranged at a space $D_1$ from the edge of at least one flange joint portion 55 in the direction of extension of the one flange joint portion 55 in the imaginary plane and at a space $D_2$ from the inner panel 50. In this case, the spaces constitute an energy absorbing space, and an energy absorber 142 is arranged in the energy absorbing space.

According to the absorption structure shown in FIG. 12, the energy absorber 142 is further provided integrally with the pillar garnish 140. The pillar garnish 140 has a hollow portion 146 defined by double walls 144, 145 at portions corresponding to both the spaces $D_1$, $D_2$. In this case, the walls 144, 145 and the hollow portion 146 constitute an energy absorbing portion. In addition, a plurality of ribs 147 are projected outward from the outside wall 145 at an interval in the direction perpendicular to the imaginary plane. The positions of the hollow portion 146 and the plurality of ribs 147 are determined such that the hollow portions 146 and the ribs 147 are located within both the spaces $D_1$, $D_2$. As a result, the energy absorber 142 is constituted by the hollow portion 146 and the ribs 147. In this case, for example, the pillar garnish 140 having the walls 144, 145 and the hollow portion 146 is first formed by blow molding, and subsequently, the ribs 147 are formed by injection molding. While the pillar garnish 140 is provided with the hollow portion 146, the size of the hollow portion 146 can be reduced, since the hollow portion 146 carries out the absorption of energy together with the ribs 147.

Therefore, the pillar garnish can be formed by blow molding with accuracy. Further; even though a portion of the wall 145 corresponding to the rib portion 147 creates a strain in case of injection molding, the strain is never open to the view in the compartment, since the wall 145 is located on the outside of the wall 144.

The pillar garnish 140 is mounted on the inner panel 50 of the front pillar 56 with clips (not shown) attached between the plurality of ribs 147. When a load of not less than a predetermined value is applied, the hollow portion 146 of the pillar garnish 140 is depressed, and thereafter, the ribs 147 are buckled to absorb the impact energy caused by the load. According to this embodiment, since the impact energy caused by the load can be absorbed by the deformation of the hollow portion and the buckling of the ribs, the sectional dimension of the hollow portion and the height of each rib in the imaginary plane can be reduced. In other words, the accuracy of the thickness around the hollow portion can be enhanced in case of molding the pillar garnish, and as a result, the stable absorbability of energy can be easily ensured.

Figure 14:
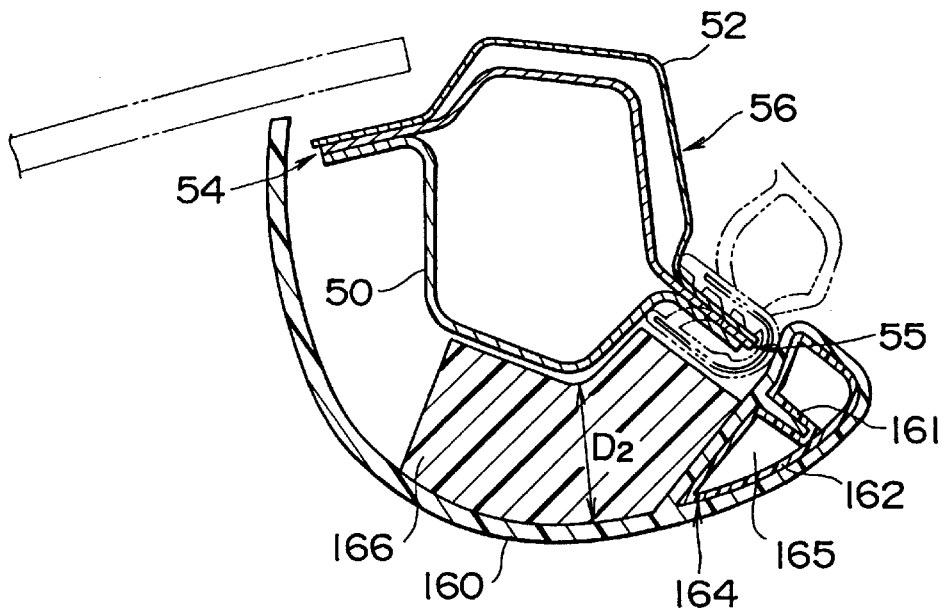
FIG. 14 is a sectional view similar to that of FIG. 1 and showing a structure of absorbing impact energy using an interior material for an automobile as a yet further embodiment of the present invention.
Figure 15:
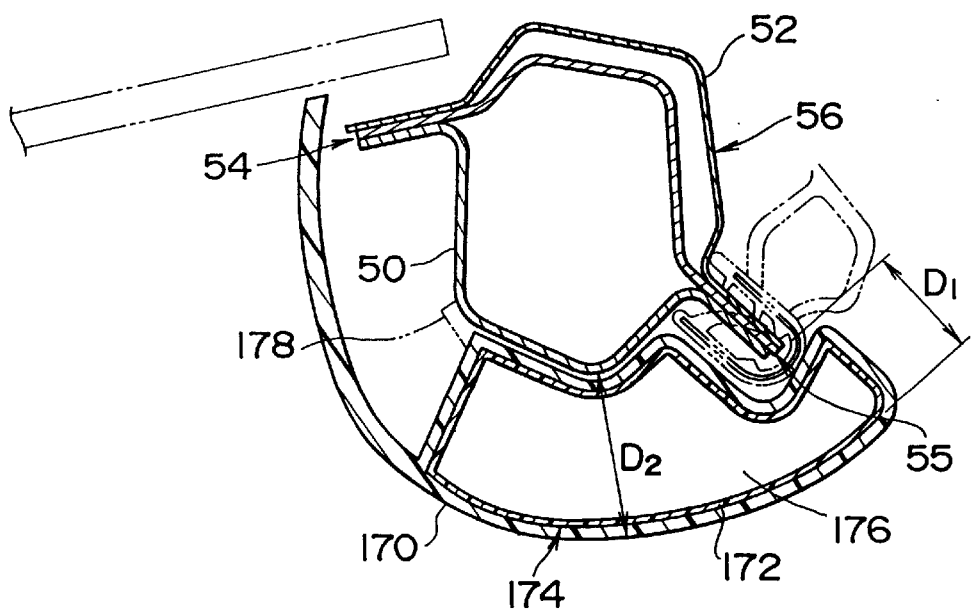
FIG. 15 is a sectional view similar to that of FIG. 1 and showing a structure of absorbing impact energy using an interior material for an automobile as a yet further embodiment of the present invention.

According to an absorption structure shown in FIGS. 13 to 15, an interior material 150 arranged on the inside of the inner panel 50 of the structural member 56 of the vehicle body is used to absorb impact energy. The structural member 56 has two flange joint portions 54, 55 formed by joining the flanges 51A, 51B of the inner panel 50 and the respectively confronting flanges 53A, 53B of the outer panel 52 together in an overlap state, and is formed to have a closed structure in cross section taken along the imaginary plane. In the illustrated embodiment, the structural member 56 corresponds to the similar front pillar to that shown in FIG. 1, and the interior material 150 corresponds to a pillar garnish. In the absorption structure, the pillar garnish 150 is arranged at a space $D_1$ from the edge of at least one flange joint portion 55 in the direction of extension of the one flange joint portion 55 in the imaginary plane and at a space $D_2$ from the inner panel 50. In this case, the spaces constitute an energy absorbing space, and an energy absorber 152 is arranged in the energy absorbing space.

In the absorption structure shown in FIGS. 13 to 15, an energy absorber having a hollow portion formed by insert molding is provided integrally with the pillar garnish.

In the absorption structure shown in FIG. 13, the pillar garnish 150 is formed by blow molding such that a tubular material 154 is embedded as an insert. The energy absorber 152 is composed of a hollow portion 155 provided in the neighborhood of the flange joint portion 55, and a plurality of ribs 156 arranged in the space $D_2$. The tubular material 154 corresponds to a product formed by blow molding or a bent thin metal sheet.

In the absorption structure shown in FIG. 14, a pillar garnish 160 is formed by blow molding such that a tubular material 162 having a rib 161 is embedded as an insert. An energy absorber 164 is composed of two hollow portions 165 provided in the neighborhood of the flange joint portion 55 and a plurality of ribs 166 arranged in the space $D_2$. The tubular material 162 corresponds to a product formed by blow molding or a bent thin metal sheet.

In the absorption structure shown in FIG. 15, a pillar garnish 170 is formed by blow molding such that a tubular material 172 is embedded as an insert. An energy absorber 174 is composed of the tubular material 172 and a hollow portion 176 substantially occupying the spaces $D_1$, $D_2$. The tubular material 172 corresponds to a product formed by blow molding.

According to the absorption structures shown in FIGS. 13 and 14, a clip mounted between the ribs is used to mount the pillar garnish on the inner panel. On the other hand, according to the absorption structure shown in FIG. 15, a screw extending through a plurality of mounting seats 178 or a clip (not shown) is used to mount the pillar garnish on the inner panel. When a load of not less than a predetermined value is applied, the pillar garnish 150, 160 or 170 is deformed. With the deformation of the pillar garnish, the tubular material 154, 162 or 172 of the energy absorber is deformed to depress the hollow portion. Further, in case of the energy absorber having the ribs 156 or 166, these ribs are buckled. As a result, the impact energy caused by the load can be absorbed. According to the embodiments shown in FIGS. 13 to 15, the absorption structure is provided with the energy absorber formed by insert molding. In this case, since the energy absorber can be formed separately from the pillar garnish, and a desired performance can be provided for the energy absorber, it is possible to attain the stable absorbability of energy.

Figure 16:
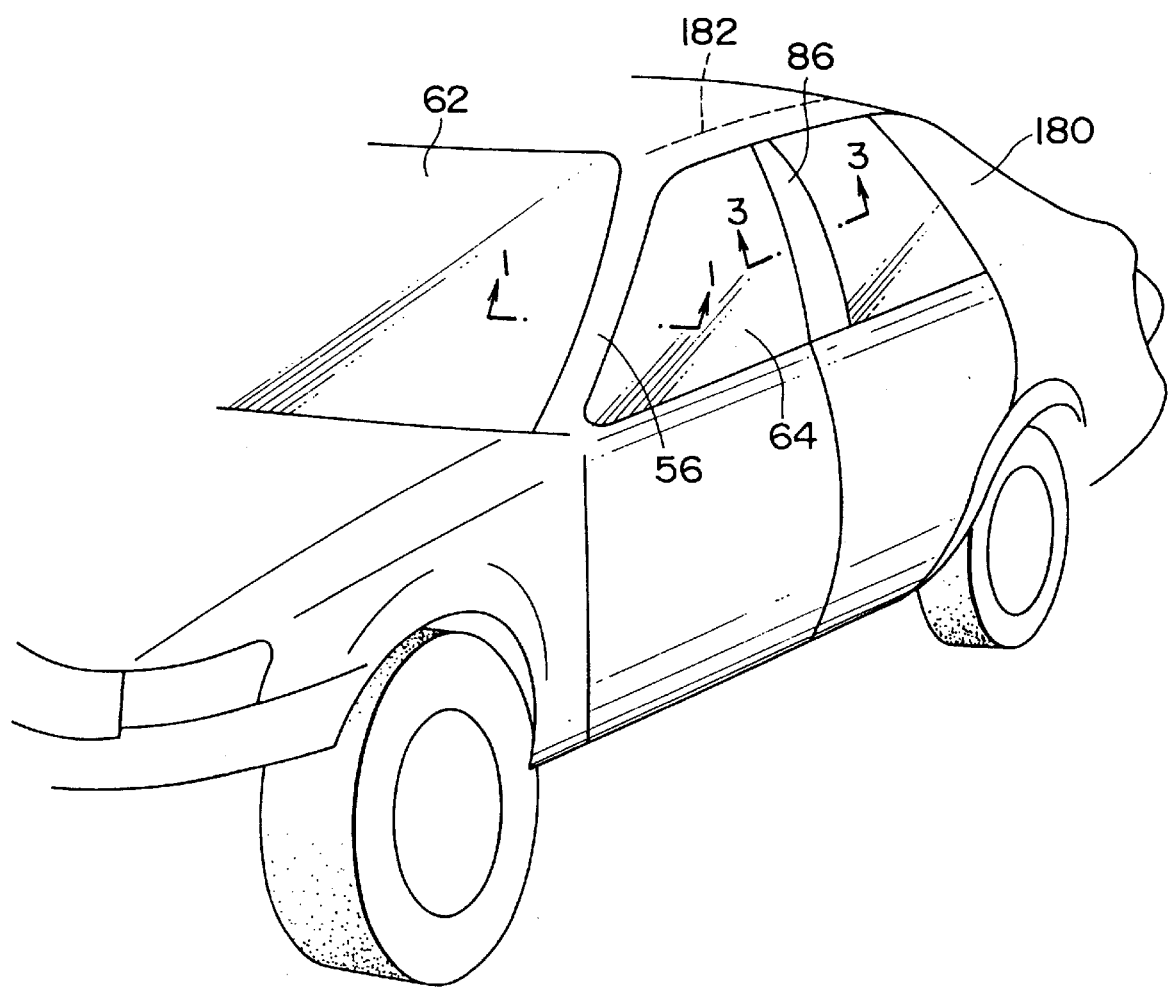
FIG. 16 is a perspective view showing an automobile capable of embodying a structure of absorbing impact energy using an interior material for an automobile according to the present invention.

While the preceding embodiments are described with respect to the structural member in case of the front pillar and the center pillar, the vehicle body has other structural members such as a rear pillar 180 and a roof side rail 182 as shown in FIG. 16. Thus, since there is also a possibility of exerting impact due to such other structural members themselves or the flange joint portions thereof, the preceding embodiments can be applied also to such other structural members as well as the interior materials arranged on the inside of such other structural members. The same can be applied also to the embodiments described hereinafter.

Figure 17A:
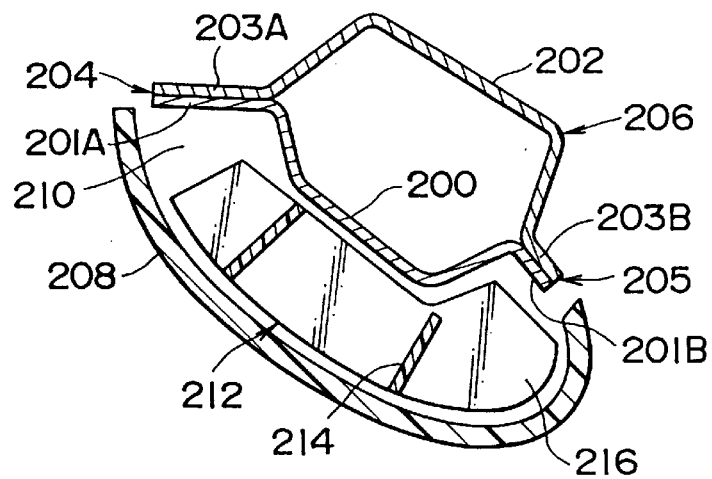
FIG. 17(a) is a sectional view taken along a line 17a—17a of FIG. 19.
Figure 17B:
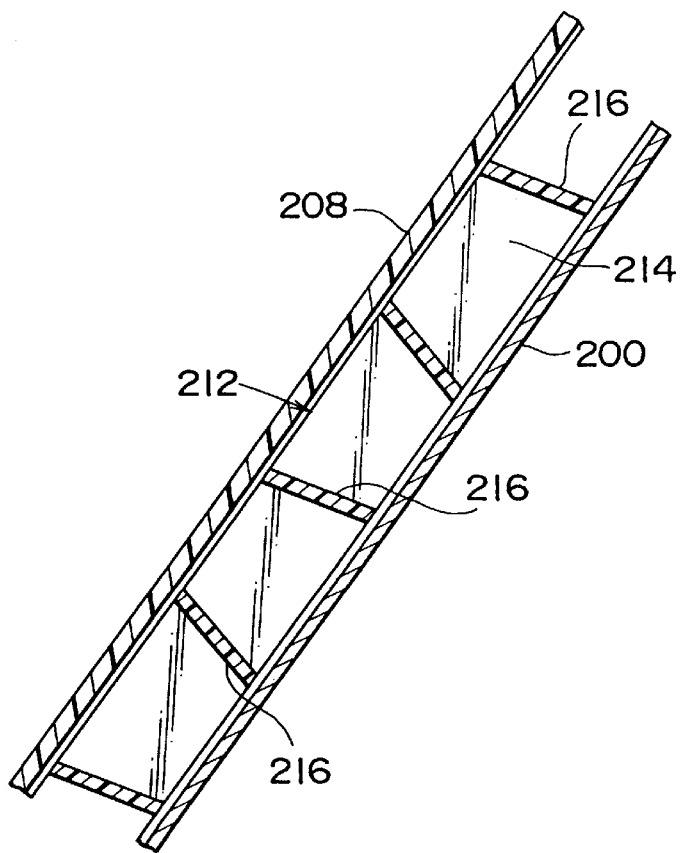
FIG. 17(b) is a sectional view taken along a line 17b—17b of FIG. 19.

According to an absorption structure shown in FIG. 17, an interior material 208 arranged on the inside of an inner panel 200 of a structural member 206 of the vehicle body is used to absorb impact energy. The structural member 206 has two flange joint portions 204, 205 formed by joining flanges 201A, 201B of the inner panel 200 and respectively confronting flanges 203A, 203B of an outer panel 202 together in an overlap state, and is formed to have a closed structure in cross section taken along a substantially horizontal imaginary plane. In the illustrated embodiment, the structural member 206 corresponds to a front pillar, which is different in structure from that shown in FIG. 1. The interior material 208 corresponds to a pillar garnish. The pillar garnish 208 is arranged at an energy absorbing space 210 from the inner panel 200, and an energy absorber 212 is arranged in the energy absorbing space 210.

The pillar garnish 208 is formed by injection molding with a hard resin, i.e., polypropylene. As shown in FIG. 17a, the pillar garnish 208 takes an approximately C-like shape in cross section, and is formed to continuously extend by a predetermined length in the longitudinal direction, i.e., the direction perpendicular to the plane of FIG. 17a, while varying the size in the sectional shape. The size of the energy absorbing space 210 defined between the pillar garnish 208 and the inner panel 200 is preferably set to be in the range of 15 to 30 mm.

An energy absorber 212 is formed as a lattice-like member separately from the pillar garnish 208, and arranged in the energy absorbing space 210. The lattice-like member 212 is made of a resin and capable of absorbing energy and has one or a plurality of longitudinal ribs 214 extending in the longitudinal direction of the pillar garnish 208 and a plurality of lateral ribs 216 extending to ross the longitudinal ribs. At least either of the longitudinal ribs 214 and the lateral ribs 216 are inclined to the inner panel 200 and the pillar garnish 208.

Figure 19:
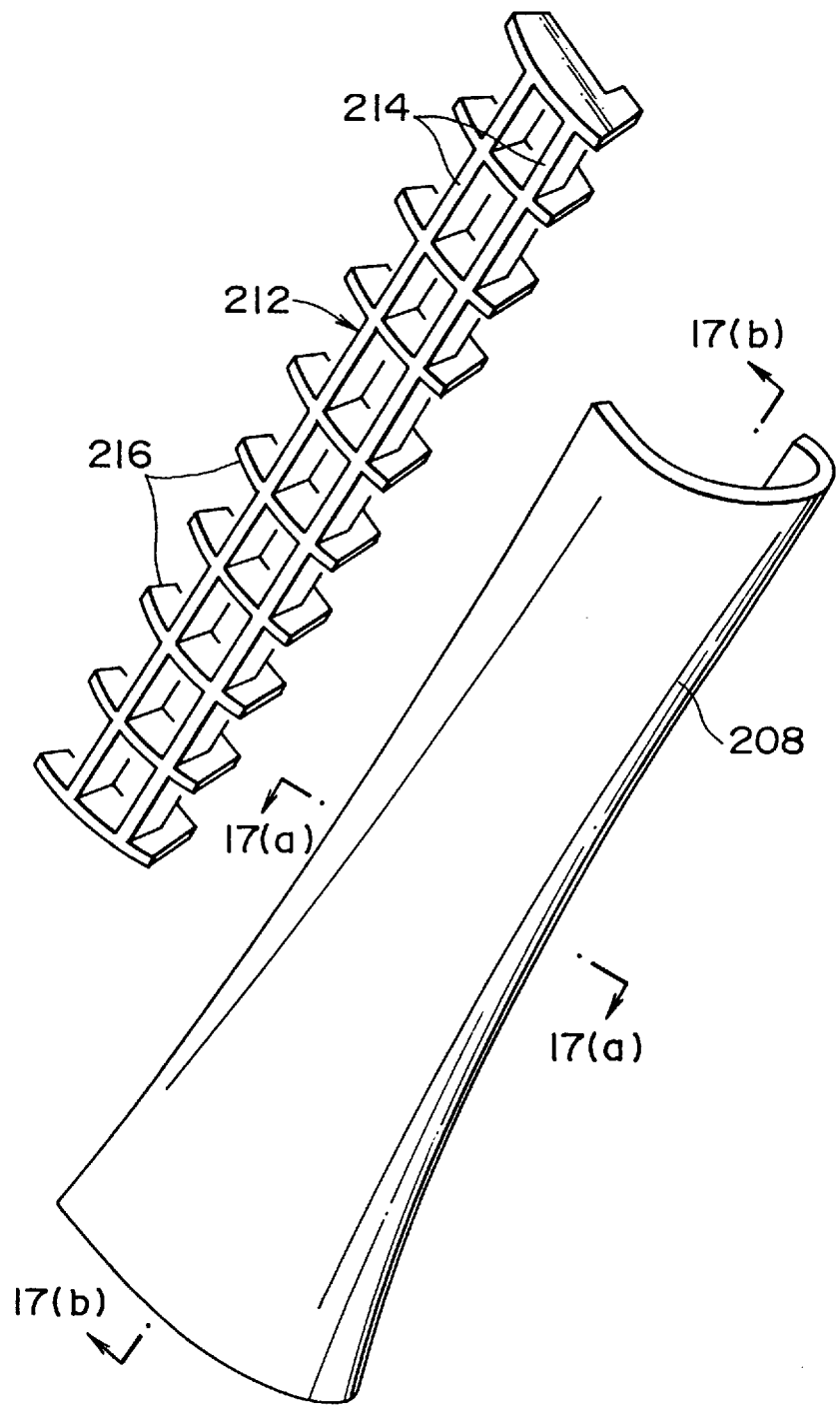
FIG. 19 is an exploded perspective view showing a pillar garnish and a lattice-like member available for the absorption structure shown in FIG. 17.

In an embodiment shown in FIG. 19, the lattice-like member 212 is formed by injection molding with an impact-resistant resin (i.e., TSOP-YK3 manufactured by Mitsubishi Yuka, and STN-15 manufactured by GE Plastics), and has two longitudinal ribs 214 and ten lateral ribs 216 extending in the direction orthogonal to the longitudinal ribs 214. The lateral ribs 216 can be also arranged so as to extend horizontally, when the lateral ribs 216 are mounted on the inner panel 200 as will be described later. Since the number of the lateral ribs 216 is larger than that of the longitudinal ribs 214, the lateral ribs 216 mainly function to absorb the load, while the longitudinal ribs 214 mainly function to hold the lateral ribs 216. The pitch of the mutually adjacent ribs and the thickness of each rib may be respectively set to be within the range of 15 to 30 mm and 1 to 2 mm.

Since the lattice-like member 212 is formed separately from the pillar garnish 208, the impact-resistant resin as described above can be used for the lattice-like member 212, and as a result, the absorbability of energy can be improved. Otherwise, the hard resin such as polypropylene similar to that used for the pillar garnish 208 can also be used as the resin for the lattice-like member. While the lattice-like member 212 can be formed according to a hard urethane foaming method or a polypropylene bead foaming method, it is possible to much reduce the cost in case of forming the lattice-like member by injection molding.

At least either of the longitudinal ribs 214 and the lateral ribs 216 of the lattice-like member 212 are inclined to the inner panel 200 and the pillar garnish 208, and as a result, each joint portion of the longitudinal ribs 214 and the lateral ribs 216 can be inclined to the inner panel 200 and the pillar garnish 208. On the other hand, when the longitudinal ribs and the lateral ribs are formed to be substantially orthogonal to the inner panel and the pillar garnish, each joint portion of the longitudinal ribs and the lateral ribs comes to be substantially normal to the inner panel and the pillar garnish. Thus, when the longitudinal ribs and the lateral ribs are of the same size, the joint surface area of each joint portion where at least either of the longitudinal ribs and the lateral ribs are inclined becomes larger than the joint surface area of each joint portion where the longitudinal ribs and the lateral ribs are substantially orthogonal. As a result, a large load is required to shear the joint portions, and the sharp rise characteristics of a load against the deformation can be attained.

According to the embodiment described above, since each joint portion of the longitudinal ribs and the lateral ribs of the lattice-like member is inclined to the pillar garnish, each joint portion is easily sheared by any of a load applied from the direction orthogonal to the pillar garnish and a load applied from the direction inclined to the pillar garnish. Thus, since the impact energy is absorbed by the shear, the absorbability of energy can be made stable. On the other hand, when each joint portion is substantially orthogonal to the pillar garnish, each joint portion exerts the large resistance against the load applied from the direction orthogonal to the pillar garnish, while the ribs easily slide along the surface of the inner panel or is easily bent due to the load applied from the direction inclined to the pillar garnish. Therefore, in this case, the stable absorbability of energy cannot be attained. Further, since the lattice-like member is formed separately from the pillar garnish, each inclination angle of at least either of the longitudinal ribs and the lateral ribs can be freely determined as well as the number or the like of the longitudinal ribs and lateral ribs.

The lateral ribs 216 of the lattice-like member 212 substantially functioning to absorb a load are inclined to the inner panel 200 and the pillar garnish 208, and at least either of a pair of lateral ribs located adjacent to each other in the longitudinal direction and a pair of lateral ribs located adjacent to each other in the crossing direction can be arranged so as to be inclined reverse to each other.

Figure 18:
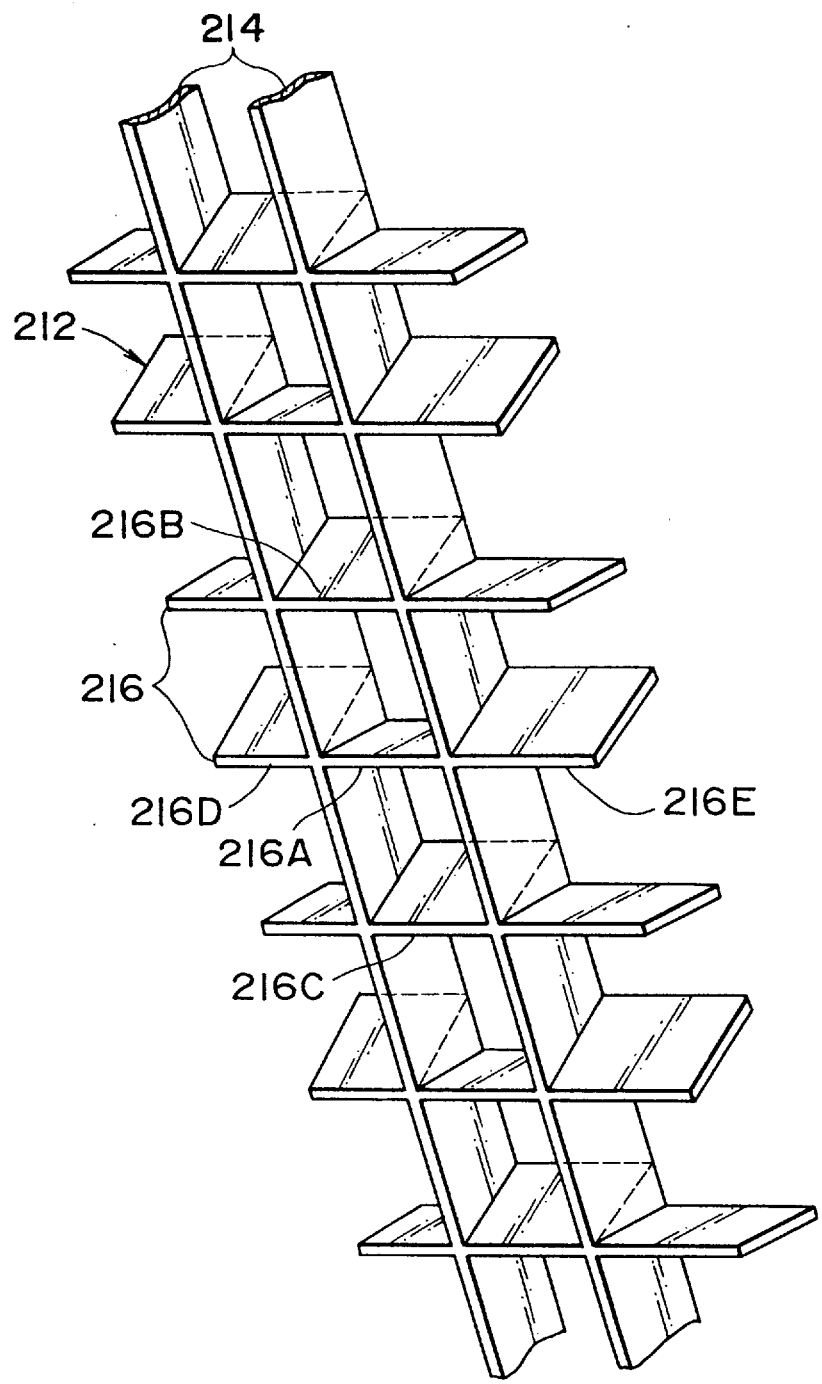
FIG. 18 is a perspective view showing a lattice-like member as an embodiment available for the absorption structure shown in FIG. 17.

In the embodiment shown in FIG. 18, the pair of lateral ribs 216 located adjacent to each other in the longitudinal direction and the pair of lateral ribs 216 located adjacent to each other in the crossing direction are arranged so as to be inclined reverse to each other. Namely, the arbitrary lateral rib 216A and the lateral rib 216B or 216C located adjacent to the lateral rib 216A in the longitudinal direction are inclined reverse to each other. Further, the arbitrary lateral rib 216A and the lateral rib 216D or 216E located adjacent to the lateral rib 216A in the crossing direction are inclined reverse to each other. The arrangement of the lateral ribs described above is the most preferable to reduce the influence depending on the direction of application of the impact load so as to easily disperse the impact load, even though the impact load is applied from every directions to the lattice-like member, which will be described later.

In order to reduce the influence depending on the direction of application of the load so as to disperse the load, at least either of the pair of lateral ribs located adjacent to each other in the longitudinal direction and the pair of lateral ribs located adjacent to each other in the crossing direction can be arranged so as to be inclined reverse to each other. For instance, the pair of lateral ribs located adjacent to each other in the crossing direction can be arranged so as to be inclined reverse to each other, while the lateral ribs aligned in the longitudinal direction can be inclined in the same direction. Next will be described with reference to FIG. 18. The arbitrary lateral rib 216A and the lateral rib 216D or 216E located adjacent to the lateral rib 216A in the crossing direction are arranged so as to be inclined reverse to each other, while all the lateral ribs aligned with the lateral rib 216A in the longitudinal direction are inclined in the same direction as the lateral rib 216A. Similarly, all the lateral ribs aligned with the lateral rib 216D in the longitudinal direction are inclined in the same direction as the lateral rib 216D, and all the lateral ribs aligned with the lateral rib 216E in the longitudinal direction are inclined in the same direction as the lateral rib 216E.

According to the embodiment described above, the lateral ribs are inclined and at least either of the pair of lateral ribs located adjacent to each other in the longitudinal direction and the pair of lateral ribs located adjacent to each other in the crossing direction are arranged so as to be inclined reverse to each other. In this embodiment, even though the load is applied to the pillar garnish from every directions, the difference in the absorbability of energy depending on the direction of the load can be reduced to further improve the stability.

One or a plurality of joint portions formed by joining one or the plurality of longitudinal ribs 214 and the plurality of lateral ribs 216 of the lattice-like member 212 together in a cross state can be formed to have the joint area different from that of other joint portions. According to the present invention, since the lattice-like member 212 is formed independently of the pillar garnish 208, the lattice-like member 212 can be easily formed as described above without being largely restricted by molding. In case of the lattice-like member 212 having the longitudinal ribs 214 and the lateral ribs 216, it is confirmed on experiment that the joint portions create a shear to thereby absorb the energy. On the other hand, since the shearing force is proportional to the size of the joint area, the absorbability of energy can be effectively varied by varying the joint area. Otherwise, the absorbability of energy can be effectively varied by selecting the material as described above.

Figure 20A:
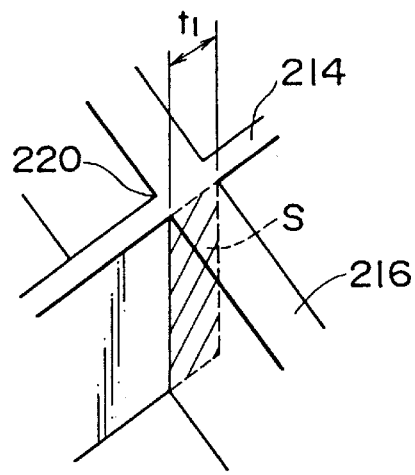
FIGS. 20(a), 20(b) and 20(c) show different joint portions.
Figure 20B:
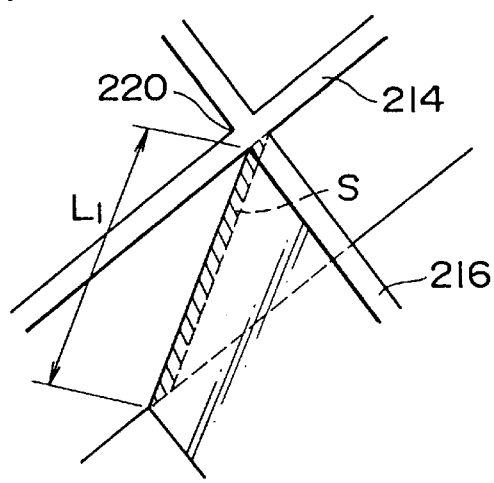
Figure 20C:
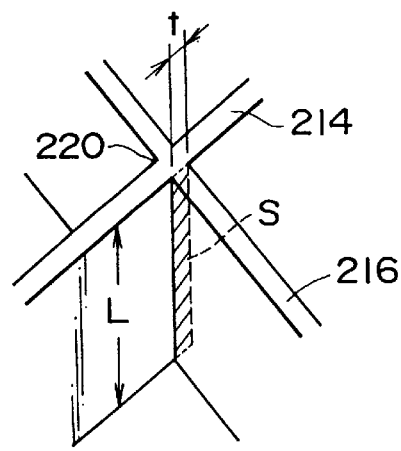

As shown in FIG. 20, the joint areas (shown by slant lines for convenience of explanation) of a joint portion 220 is given by a product of the joint length L and the thickness t of the inclined rib, in the illustrated embodiment, the lateral rib 216 (see FIG. 20(c)). Thus, the joint area S can be arbitrarily determined by varying the thickness of the lateral rib 216 into a value $t_1$ (see FIG. 20(a)) larger than t or the joint length into a value $L_1$ (see FIG. 20(b)) longer than L. In this case, the joint length $L_1$ can be obtained by varying the inclination angle of the lateral rib 216. Accordingly, the joint length can be varied, while the predetermined height L of the lattice-like member 212 is held constant.

In the embodiment shown in FIG. 20, the lateral ribs 216 are inclined. Otherwise, the longitudinal ribs 214 can be inclined or both the lateral ribs 216 and the longitudinal ribs 217 can be inclined. Thus, the joint area S of the joint portion 220 can be varied by varying the thickness and inclination angle of each longitudinal rib 214, in addition to the thickness and inclination angle of each lateral rib 216 as described above. As a result, the joint area S can be varied depending on at least one of the thickness and inclination angle of the longitudinal and lateral ribs described above.

According to the embodiment, one or the plurality of joint portions formed by joining one or the plurality of longitudinal ribs and the plurality of lateral ribs together in a cross state can be formed to have the joint area different from that of other joint portions. In this embodiment, even though the lattice-like member has portions required to have the high absorbability of energy, such as a portion of the seat for mounting the pillar garnish on the lattice-like member or mounting the lattice-like member on the inner panel of the pillar, or the flange joint portion of the pillar, for instance, it is possible to obtain the high absorbability of energy by enlarging the joint area of the joint portion of such portions described above. Therefore, this embodiment can eliminate such waste that the whole lattice-like member is constituted to conform to the absorbability of energy in order to satisfy the absorbability of energy required at such a partial portion. As a result, the lattice-like member can be designed rationally.

Further, the joint area is varied depending on at least one of each thickness of the longitudinal and lateral ribs, and each inclination angle of the longitudinal and lateral ribs. In this case, since the degree of freedom in design is large and the shearing force is proportional to the size of the joint area, the load characteristics against the deformation can be easily determined. Further, there is no possibility of narrowing the space in the compartment or sacrificing the visual range in case of the pillar garnish for the front pillar in order to exert the desired absorbability of energy without increasing the size of the pillar garnish.

Figure 21:
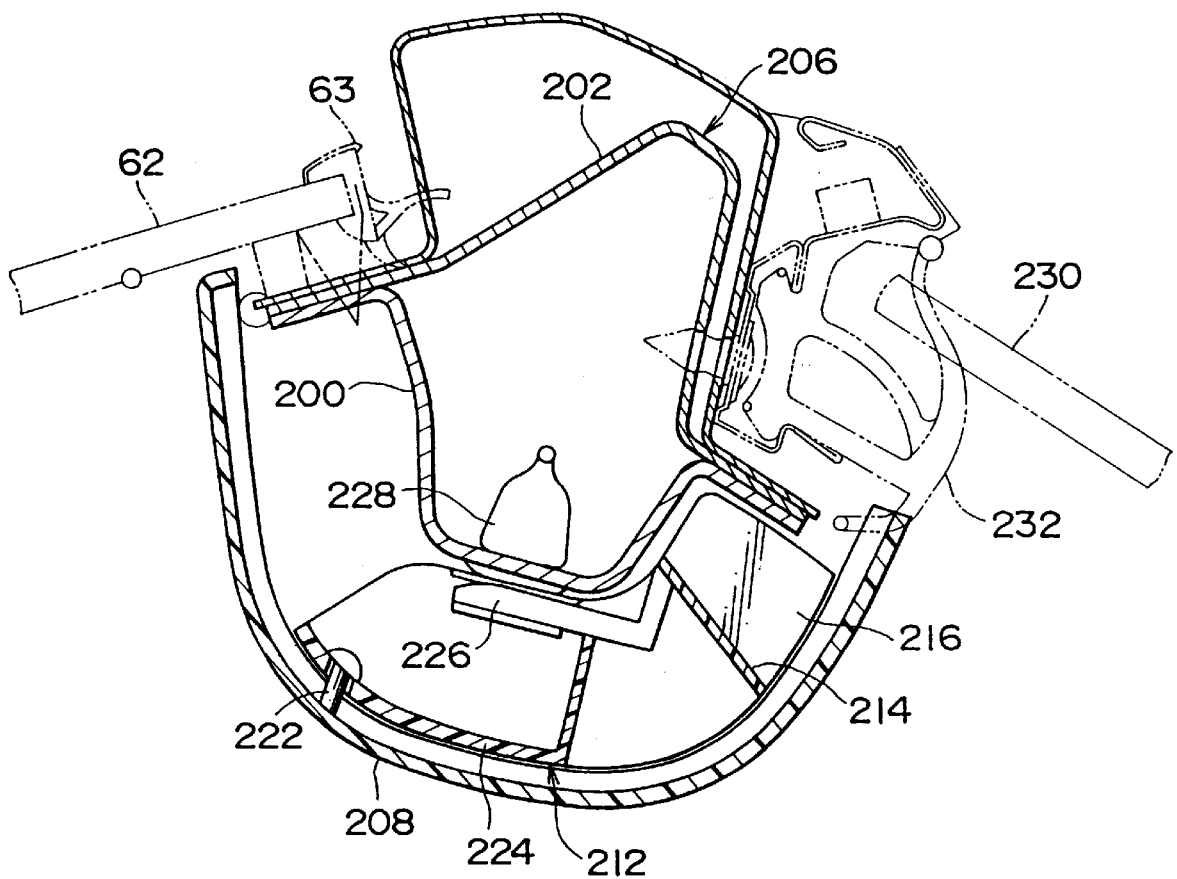
FIG. 21 is a sectional view similar to that of FIG. 17(a) and showing a usable pillar mounted with a structure of absorbing impact energy using an interior material for an automobile according to the present invention.

As shown in FIG. 21, a plurality of welding portions 222 (only one of them is shown) are integrally provided on the pillar garnish 208, while a mounting seat 224 is integrally provided on a portion of the lattice-like member 212 facing to each welding portion 222. In this case, the welding portions 222 can be inserted into the holes of the mounting seat 224 for fusing to weld together the pillar garnish 208 and the lattice-like member 212 formed separately from each other. The mounting seat 224 can be provided only at a required portion of the lattice-like member 212. Preferably, the mounting seat 224 is integrally formed with the longitudinal ribs 214 and the lateral ribs 216 at least on three sides of the mounting seat to enhance the rigidity.

As shown in FIG. 21, a plurality of mounting seats 226 (only one of them is shown) are integrally provided on the lattice-like member 212. In this case, a clip 228 inserted into the mounting seat 226 can be inserted into the inner panel 200 of the pillar 206 to mount the lattice-like member 212 on the pillar 206. The mounting seat 226 is also formed integrally with the longitudinal ribs 214 and the lateral ribs 216 at least on three sides of the mounting seat 226. More preferably, the mounting sheet is formed to take an L-like shape in cross section to enhance the rigidity. The mounting seats 226 and 224 are provided on different portions of the lattice-like member 212 without any hindrance to the release of a mold after molding the lattice-like member 212.

As shown in FIG. 21, a wind shield glass 62 is mounted on the pillar 206 through a seal material 63, and a door glass 230 is further mounted on the pillar 206. The door glass 230 is sealed with a weather strip 232.

Figure 22A:
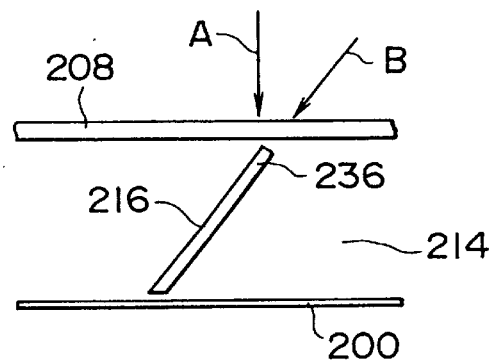
FIG. 22(a) shows a case of the present invention.

The lattice-like member 212 functions as follows. When a load of not less than a predetermined value is applied, the longitudinal ribs 214 and the lateral ribs 216 of the lattice-like member are deformed, and thereafter, the joint portions of the longitudinal ribs 214 and the lateral ribs 216 are sheared. As shown in FIG. 22(a), since a joint portion 236 of the longitudinal rib 214 and the lateral rib 216 of the lattice-like member is inclined to the inner panel 200 and the pillar garnish 208, the joint portion 236 is deformed to be easily sheared due to either of the load applied from the direction A orthogonal to the pillar garnish 208 and the load applied from the direction B inclined to the pillar garnish 208. When the impact energy is absorbed by the deformation and shear of the joint portions, the load characteristics against the displacement represent a sharp rise as shown by $E_1$ in FIG. 24. Then, it is possible to exert the absorbability of energy approximately close to the absorbability of energy $F_0 S_0$ at a time when the load corresponds to a predetermined value $F_0$ and the displacement corresponds to a predetermined value $S_0$.

Figure 22B:
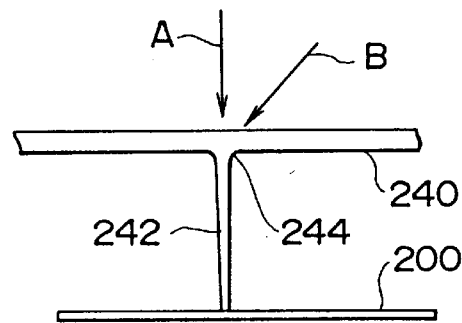
FIGS. 22(b) through 22(d) show the different state of the pillar garnish having the orthogonal rib, respectively.
Figure 22C:
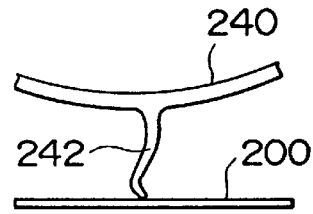
Figure 22D:
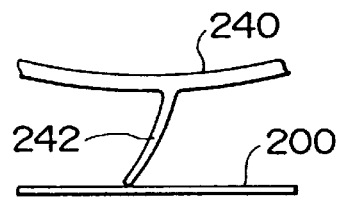
Figure 24:
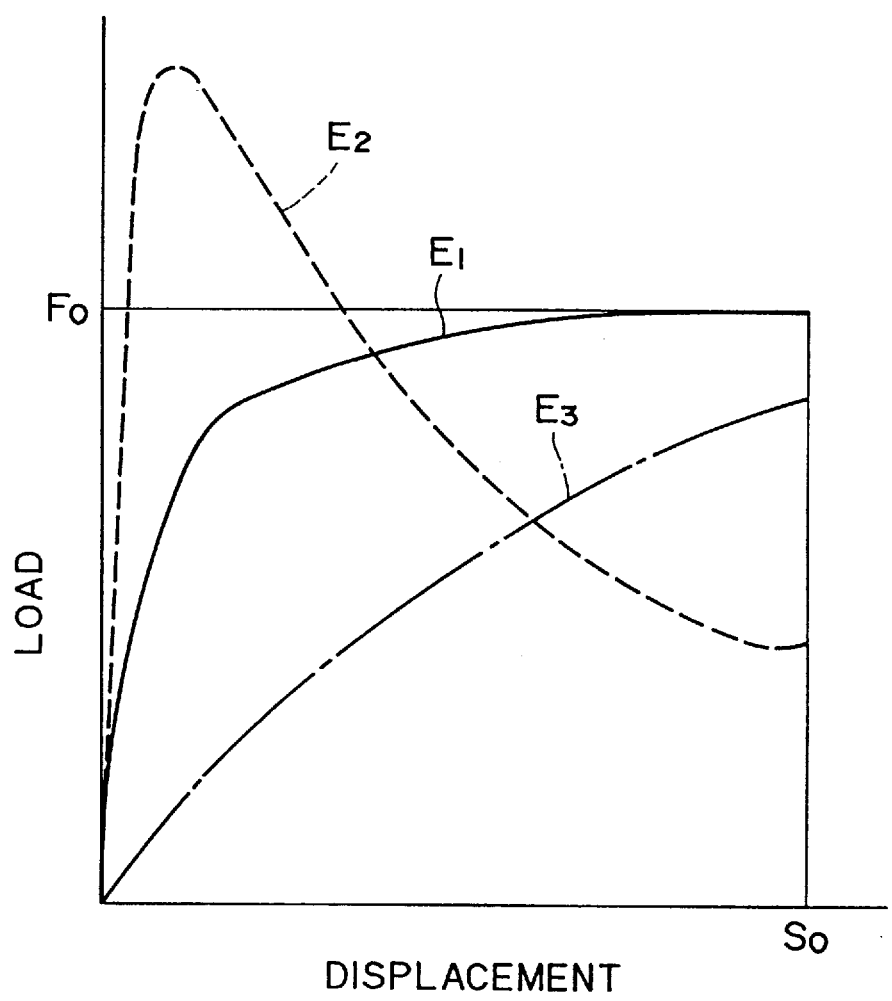
FIG. 24 is a graph showing the load characteristics against displacement.

As shown in FIG. 22(b), when a joint portion 244 of each rib 242 projecting from the pillar garnish 240 in the shape of a lattice is substantially orthogonal to the pillar garnish 240, each joint portion 244 exerts large resistance against the load applied from the direction A orthogonal to the pillar garnish 240. As a result, a large load exceeding a predetermined value is applied, and the load characteristics as shown by $E_2$ in FIG. 24 is obtained. In this case, as shown in FIG. 22(c), the ribs 242 are not sheared but buckled. Further, when a load is applied from the direction B inclined to the pillar garnish 240, the ribs 242 slide along the surface of the inner panel 200 or are easily bent as shown in FIG. 22(d). As a result, the load characteristics represent a rise shown by $E_3$ in FIG. 24. In this manner, when the ribs 242 are orthogonal to the pillar garnish 240, the ribs 242 are not behaved constant, and therefore, the stable absorbability of energy cannot be attained.

Figure 23A:
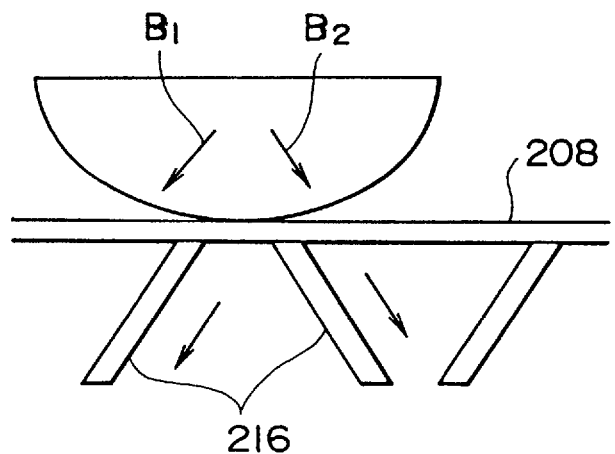
FIG. 23(a) shows a case of the present invention.
Figure 23B:
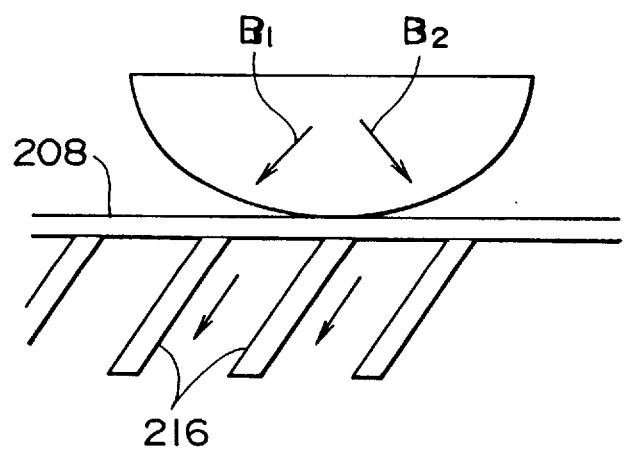
FIG. 23(b) shows a case of the model.

As shown in FIG. 23(a), the lateral ribs 216 are inclined and the pair of the lateral ribs 216 located adjacent to each other in the longitudinal direction or in the crossing direction are arranged to be inclined reverse to each other. In this case, when the load is applied from the directions $B_1$, $B_2$ inclined to the pillar garnish 208, the load is applied in a dispersed state to the lateral ribs 216. As shown in FIG. 23(b), even though the lateral ribs are inclined in the same direction, the load can be applied in a dispersed state to the lateral ribs 216. However, the manner of holding the lateral ribs 216 against the load in case of FIG. 23(a) is different from that in case of FIG. 23(b). In case of FIG. 23(a), since the difference in the manner of holding the lateral ribs against the load is smaller than that in case of FIG. 23(b), the influence depending on the direction of the load can be reduced to easily make the absorbability of energy stable.

Figure 25:
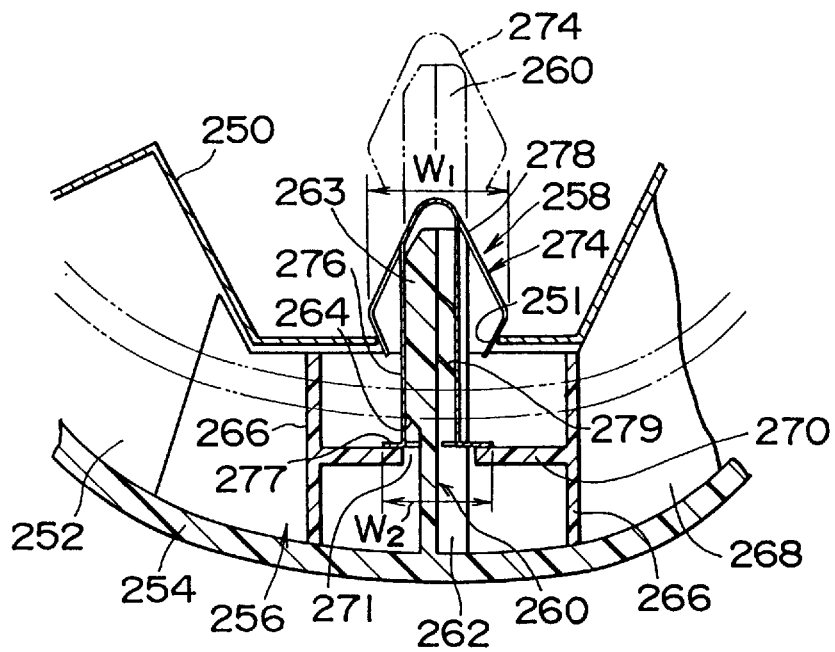
FIG. 25 is a sectional view similar to that of FIG. 1 or 17 and showing only an essential portion of a structure of absorbing impact energy using an interior material for an automobile as a yet further embodiment of the present invention.
Figure 26:
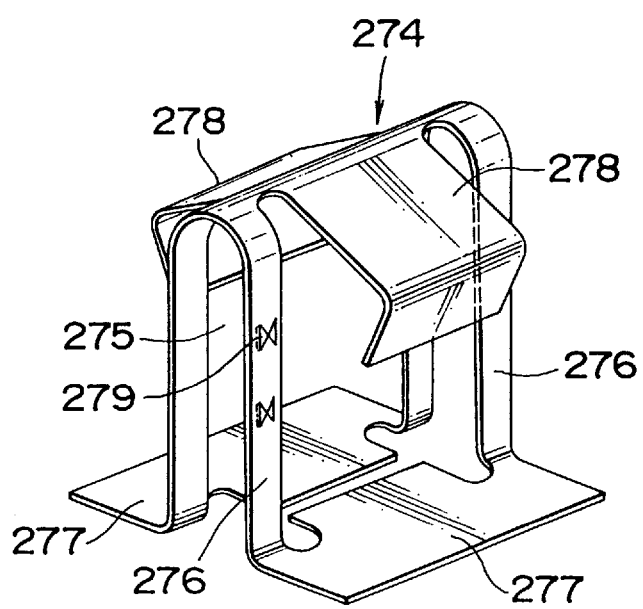
FIG. 26 is a perspective view showing a fixing tool for a clip used for the absorption structure shown in FIG. 25.
Figure 27:
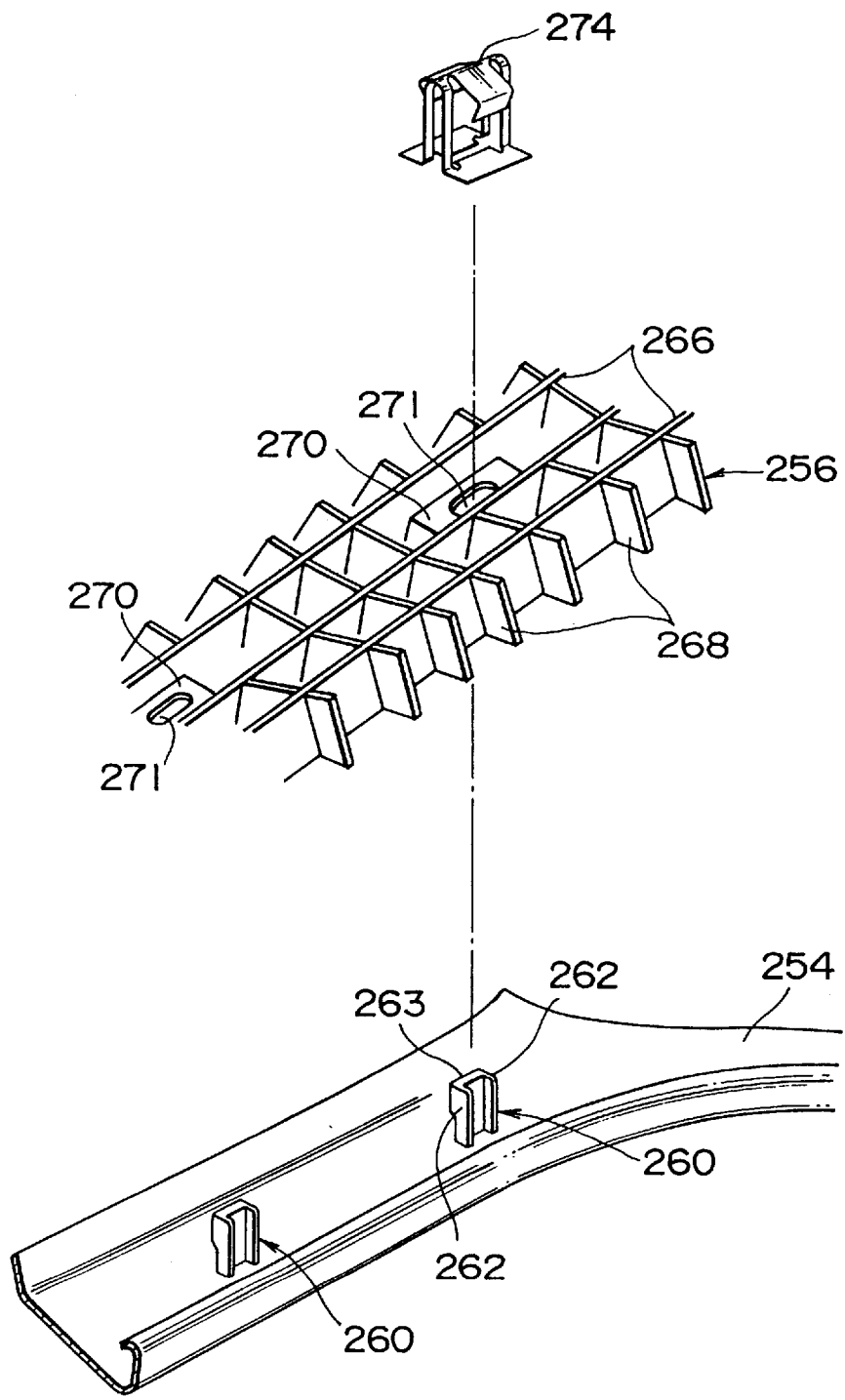
FIG. 27 is an exploded perspective view showing an interior material, an energy absorber and a fixing tool used for the absorption structure shown in FIG. 25.

An absorption structure shown in FIGS. 25 to 27 is similar to the preceding embodiments in that an interior material 254 is arranged through an energy absorbing space 252 on the inside of an inner panel 250, and a lattice-like energy absorber 256 is arranged in the energy absorbing space 252. In addition, the absorption structure of the embodiment is provided with a special clip 258. The clip 258 can be used instead of the clip described in the preceding embodiments.

According to the embodiment shown in FIGS. 25 to 27, the interior material 254 corresponds to a pillar garnish, and has a plurality of integrally-formed bosses 260. The bosses 260 are formed at the same time when the pillar garnish is formed. Each boss 260 is composed of two horizontal legs 262 arranged vertically at an interval in case of mounting the interior material 254, and one side vertical leg 263 connected to two horizontal legs 262. In addition, an inclined shoulder portion 264 is provided to lay between two horizontal legs 262 and the vertical leg 263. Each boss 260 has a length sufficient to project outward from a hole 251 of the inner panel 250 in case of mounting the interior material 254.

On the other hand, the energy absorber 256 has a plurality of longitudinal ribs 266, a plurality of lateral ribs 268 mutually crossing the plurality of longitudinal ribs and a plurality of bearing surfaces 270. Each bearing surface 270 is provided with a through hole 271 allowing of the insertion of the boss 260. The longitudinal ribs 266 and the lateral ribs 268 can be formed similarly to those in the preceding embodiments. The bearing surfaces 270 are provided correspondingly to the plurality of bosses 260 of the interior material 254. As is apparent from FIG. 25, the bearing surfaces 270 are located between the interior material 254 and the inner panel 250 and formed integrally with the mutually adjacent two longitudinal ribs 266.

The energy absorber 256 has a fixing tool 274 which can be inserted into the boss for fixing. The clip 258 is constituted by the fixing tool 274 and the boss 260. In the illustrated embodiment, the fixing tool 274 is formed by bending a thin steel sheet and has support portions 276 bent in an inverse U-like shape to define a space 275, base portions 277 extending from both ends of each support portion 276 in the opposite directions, a contact portion 278 formed by stamping out each support portion 276 and bent in an approximately L-like shape, and a claw portion 279 having a pointed end and bent from each support portion 276 so as to project into the space 275. The vertical leg 263 of the boss 260 is inserted into the space 275 of each support portion 276.

As shown in FIG. 25, the boss 260 is inserted into the hole 271 of the bearing surface 270 of the energy absorber 256, and the fixing tool 274 is inserted into the boss 260 such that the support portions 276 of the fixing tool 274 are located on both sides of the vertical leg 263 of the boss 260. By so doing, the base portions 277 are butted against the bearing surface 270 over the shoulder portion 264 of the boss, and each claw portion 279 is intruded into the vertical leg 263 of the boss. In this manner, the energy absorber 256 can be mounted on the interior material 254 to constitute a so-called assembly. In case of mounting the assembly on the inner panel 250, the contact portions 278 of the fixing tool 274 are inserted into the hole 251 of the inner panel 250. After the contact portions 278 are contracted by the hole 251, the contact portions are restored by the action of elasticity so that the end of each contact portion 278 is caught by the hole 251. Thus, the assembly is completely mounted on the inner panel. Namely, the width $W_1$ of the largest space defined by the contact portions 278 is larger than the bore of the hole 251 of the inner panel 250.

According to the embodiment described above, one kind of clip 258 can be used to fix the energy absorber 256 to the interior material 254, while fixing the assembly of the energy absorber and the interior material to the inner panel 250, and as a result, it is possible to reduce the cost.

In the illustrated embodiment, the width $W_2$ of the base portion 277 of the fixing tool 274 is smaller than the bore of the hole 251 of the inner panel 250. According to the relation in size, when the ribs 266, 268 of the energy absorber 256 are buckled due to the load, the boss 260 of the interior material 254 and the fixing tool 274 can be fitted into the inner panel 250 as shown by imaginary lines. Accordingly, it is possible to prevent a fixing portion from locally increasing the load.

What is claimed is:

1. A structure for absorbing impact energy using a non-metallic interior material arranged on an inside of an inner panel of a structural member of a vehicle body, the structural member being provided with the inner panel and an outer panel and having two flange joint portions formed by joining respective flanges of the inner panel and the outer panel together in an overlapped state, said structural member being formed to have a closed structure in cross section taken along an imaginary plane, comprising:

an energy absorbing space composed of a first space defined by said interior material and an edge of at least one of said flange joint portions in a direction of extension of said one flange joint portion in said imaginary plane and a second space defined by said interior material and said inner panel, other than said at least one flange joint portion; and a non-metallic energy absorber having a first energy absorber portion disposed in said first space and a second energy absorber portion disposed in the second space, wherein said first energy absorber portion is provided with a hollow portion defined by two wall portions in said imaginary plane respectively facing to said edge of said at least one of said flange joint portions and to said interior material.

2. A structure for absorbing impact energy using a non-metallic interior material according to claim 1, wherein said second energy absorber portion is provided with a hollow portion defined by two wall portions in said imaginary plane respectively facing to said inner panel and to said interior material, and wherein said energy absorber has a wall portion extending along said at least one of said flange joint portions in said imaginary plane and connected to said wall portion of said second energy absorber portion facing to said inner panel and connected to said wall portion of said first energy absorber portion facing to said edge of said at least one of said flange joint portions.

3. A structure for absorbing impact energy using a non-metallic interior material according to claim 2, wherein said inner panel has a convex portion protruding inwardly in said imaginary plane, and wherein said wall portion of said second energy absorber portion facing to said inner panel has a concave portion fitted with said convex portion.

4. A structure for absorbing impact energy using a non-metallic interior material arranged on an inside of an inner panel of a structural member of a vehicle body, the structural member being provided with the inner panel and an outer panel and having two flange joint portions formed by joining respective flanges of the inner panel and the outer panel together in an overlapped state, and structural member being formed to have a closed structure in cross section taken along an imaginary plane comprising:

an energy absorbing space composed of a first space defined by said interior material and an edge of at least one of said flange joint portions in a direction of extension of said one flange joint portion in said imaginary plane and a second space defined by said interior material and said inner panel other than said at least one flange joint portion; and a non-metallic energy absorber having a first energy absorber portion disposed in said first space and a second energy absorber portion disposed in said second space, wherein said first and second energy absorber portions are formed to have a irregular shape in cross-section in said imaginary plane, and wherein a hollow portion is defined by two wall portions in said imaginary plane respectively facing to said edge of said at least one of said flange joint portions and to said interior material.

5. A structure for absorbing impact energy using a non-metallic interior material according to claim 4, wherein said energy absorber is formed to have concave portions and convex portions.

6. A structure for absorbing impact energy using a non-metallic interior material according to claim 5, wherein said inner panel has a convex portion protruding inwardly in said imaginary plane, and wherein one of said concave portions of said energy absorber is fitted with said convex portion of said inner panel.

7. A structure for absorbing impact energy using a non-metallic interior material according to claim 1 or claim 4, wherein said first energy absorber portion is located within an occupant compartment.

8. A structure for absorbing impact energy using a non-metallic interior material according to claim 1 or claim 4, wherein said energy absorber is formed by blow molding.

* * * * *